US012694895B2

(12) United States Patent
Le et al.

(10) Patent No.: US 12,694,895 B2
(45) Date of Patent: *Jul. 28, 2026

(54) FILM AND METHOD FOR BISBX (012) TEXTURE FOR SOT DEVICES

(71) Applicant: Western Digital Technologies, Inc., San Jose, CA (US)

(72) Inventors: Quang Le, San Jose, CA (US); Brian R. York, San Jose, CA (US); Cherngye Hwang, San Jose, CA (US); Xiaoyong Liu, San Jose, CA (US); Michael A. Gribelyuk, San Jose, CA (US); Son T. Le, San Jose, CA (US); Hisashi Takano, Fujisawa (JP)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/229,772

(22) Filed: Aug. 3, 2023

(65) Prior Publication Data

US 2024/0412759 A1 Dec. 12, 2024

Related U.S. Application Data

(60) Provisional application No. 63/471,923, filed on Jun. 8, 2023.

(51) Int. Cl.
*G11B 5/39* (2006.01)
*G11B 5/187* (2006.01)

(52) U.S. Cl.
CPC .............. *G11B 5/39* (2013.01); *G11B 5/1877* (2013.01); *G11B 2005/3996* (2013.01)

(58) Field of Classification Search
CPC .. G11B 2005/3996; G11B 5/1877; G11B 5/39
See application file for complete search history.

(56) References Cited

U.S. PATENT DOCUMENTS 10,121,961 B2 11/2018 Apalkov et al.
11,532,323 B1 * 12/2022 Le .......................... G11B 5/314
(Continued)

FOREIGN PATENT DOCUMENTS

JP 7227614 B2 2/2023

OTHER PUBLICATIONS

Of Afshar et al. "Magnetic behaviour of Co2MnSi full Heusler alloy under pressure and uniaxial strain: a relativistic density functional theory study." Materials Research Express, vol. 7, No. 5, May 1, 2020, p. 056101.*
(Continued)

*Primary Examiner* — Holly Rickman
*Assistant Examiner* — Lisa Chau
(74) *Attorney, Agent, or Firm* — Patterson + Sheridan, LLP

(57) ABSTRACT

The present disclosure generally relates to spin-orbit torque (SOT) device comprising a bismuth antimony (BiSb) layer. The SOT device comprises a seed layer and a BiSb layer having a (012) orientation. The seed layer comprises at least one of an amorphous/nanocrystalline material with a nearest neighbor x-ray diffraction peak with a d-spacing in the range of about 2.02 Å to about 2.20 Å; a polycrystalline material having a (111) orientation and an a-axis of about 3.53 Å to about 3.81 Å; and a polycrystalline material having a cubic (100) or tetragonal (001) orientation and an a-axis of about 4.1 Å to about 4.7 Å. When the seed layer comprises an amorphous material or a polycrystalline material having a (111), the BiSb layer is doped, and the seed layer has a lower a/c ratio than when the seed layer comprises polycrystalline material having a cubic (100) or tetragonal (001) orientation.

26 Claims, 13 Drawing Sheets

350 —

| 314 |
|---|
| 308 |
| 304 |
| 310 |
| 312 |
| 318 |
| 316 |
| 306 |
| 302 |

(56)  References Cited

U.S. PATENT DOCUMENTS

| | | | | |
|---|---|---|---|---|
| 11,694,713 | B2 * | 7/2023 | Le | G11B 5/147 |
| | | | | 360/59 |
| 11,763,973 | B2 * | 9/2023 | Le | H10N 50/85 |
| | | | | 360/324.2 |
| 2013/0099780 | A1 * | 4/2013 | Ma | G11C 11/161 |
| | | | | 324/249 |
| 2018/0366172 | A1 | 12/2018 | Wang et al. | |
| 2020/0185598 | A1 * | 6/2020 | Noh | H10N 52/00 |
| 2021/0249038 | A1 * | 8/2021 | Le | H10N 50/85 |
| 2021/0408370 | A1 * | 12/2021 | York | H10N 52/80 |
| 2023/0047223 | A1 | 2/2023 | Le et al. | |

OTHER PUBLICATIONS

International Search Report and Written Opinion for Application No. PCT/US2024/011521 dated May 13, 2024.

* cited by examiner

350

314
308
304
310
312
318
316
306
302

300

314
310
312
308
304
306
302

| BiSb | | | | (012) rectangular surface | | length ratio S |
|---|---|---|---|---|---|---|
| Sb(at.%) | a-axis | c-axis | c/a | a | b | S |
| 0 | 4.353 | 11.814 | 0.3685 | 4.353 | 4.671 | 0.9319 |
| 0 | 4.557 | 11.862 | 0.3842 | 4.557 | 4.749 | 0.9596 |
| 3 | 4.540 | 11.850 | 0.3831 | 4.540 | 4.740 | 0.9578 |
| 12 | 4.503 | 11.850 | 0.3800 | 4.503 | 4.729 | 0.9522 |
| 14 | 4.528 | 11.816 | 0.3832 | 4.528 | 4.727 | 0.9579 |
| 16 | 4.525 | 11.814 | 0.3830 | 4.525 | 4.726 | 0.9575 |
| 18 | 4.519 | 11.801 | 0.3829 | 4.519 | 4.720 | 0.9574 |

FILM AND METHOD FOR BISBX (012) TEXTURE FOR SOT DEVICES

CROSS-REFERENCE TO RELATED APPLICATIONS

This application claims benefit of U.S. provisional patent application Ser. No. 63/471,923, filed Jun. 8, 2023, which is herein incorporated by reference.

BACKGROUND OF THE DISCLOSURE

Field of the Disclosure

Embodiments of the present disclosure generally relate to spin-orbit torque (SOT) device comprising a bismuth antimony (BiSb) layer.

Description of the Related Art

BiSb layers are narrow band gap topological insulators with both giant spin Hall effect and high electrical conductivity. BiSb is a material that has been proposed in various spin-orbit torque (SOT) device applications, such as for a spin Hall layer for magnetoresistive random access memory (MRAM) devices and energy-assisted magnetic recording (EAMR) write heads.

However, utilizing BiSb materials in commercial SOT applications can present several obstacles. For example, BiSb materials have low melting points, large grain sizes, significant Sb migration issues upon thermal annealing due to its film roughness, difficulty maintaining a desired (012) or (001) orientation for maximum spin Hall effect, and are generally soft and easily damaged by ion milling.

Therefore, there is a need for an improved SOT device utilizing BiSb layer(s) having a desired crystal orientation and a high signal-to-noise ratio.

SUMMARY OF THE DISCLOSURE

The present disclosure generally relates to spin-orbit torque (SOT) device comprising a bismuth antimony (BiSb) layer. The SOT device comprises a substrate, a seed layer disposed over the substrate, and a BiSb layer disposed over the seed layer. The BiSb layer has a (012) orientation.

In one embodiment the seed layer comprises at least one of an amorphous/nanocrystalline material. The amorphous/nanocrystalline material is either defined to be a material with very short range ordering with only nearest neighbor atomic ordering (amorphous material), or one where the degree of atomic ordering also includes higher order interactions (nanocrystalline) such as $2^{nd}$ and $3^{rd}$ neighbor or higher ordering. The higher the degree of atomic order, the more the material moves from amorphous to nanocrystalline behavior, but the atomic orders stops well short of any long range order crystalline behavior.

The amorphous/nanocrystalline material has a nearest neighbor x-ray diffraction peak with a d-spacing in the range of about 2.02 Å to about 2.20 Å. The nearest neighbor diffraction peak can also be defined as representing that of a nanocrystalline material comprised of a large population of extremely local but spatially correlated hexagonal surfaces with either a local (002) hcp (hexagonal close-packed) texture defined with an a-hcp-axis from about 2.50 Å to about 2.69 Å, or as a nanocrystalline fcc (face-centered cubic) material having a local (111) orientation and an a-fcc-axis of about 3.53 Å to about 3.81 Å. These definitions will be considered equivalent for any later discussions and referral to one will be applied to all.

In another embodiment the seed layer can be a polycrystalline material having a cubic (100) or tetragonal (001) orientation with an a-axis of about 4.1 Å to about 4.7 Å.

When the seed layer comprises an amorphous/nanocrystalline material or a polycrystalline material having a (111) texture, the SOT layer or spin hall layer (SHL) is a doped BiSbX layer yielding a lower a/c ratio and a more rectangular (012) surface. When the seed layer comprises polycrystalline material having a cubic (100) or (001) tetragonal orientation, the BiSb SOT layer or SHL should be undoped, or doped with an element which decreases the c-axis relative to the a-axis of SOT layer/SHL, increasing the a/c ratio and providing more of a square (012) surface, or less rectangular surface, better matching the cubic (100) or tetragonal (001) square lattice surface of the seed layer.

In one embodiment, a SOT device comprises a substrate, a seed layer disposed over the substrate, the seed layer comprising at least one of: a polycrystalline material having a cubic (111) orientation and an a-axis of about 3.53 Å to about 3.81 Å or a hexagonal (002) orientation with an a-axis hexagonal close-packed material with a lattice parameter of a in the range of about 2.50 Å to about 2.69 Å, a polycrystalline material having a cubic (100) orientation or a tetragonal (001) orientation and an a-axis of about 4.1 Å to about 4.7 Å, and a (100) Heusler alloy with a-axis in the range of about 5.8 Å to about 6.6 Å, and a bismuth antimony (BiSb) layer disposed over the seed layer, the BiSb layer having a (012) orientation.

In another embodiment, a SOT device comprises a substrate, a seed layer disposed over the substrate, the seed layer comprising at least one of: (A) a nanocrystalline material and a polycrystalline (100) texturing material having a bcc or B2 (100) orientation with a-axis in the range of about 2.86 Å to about 3.31 Å disposed over the nanocrystalline material, or (B) a structure comprising one or more of: a polycrystalline cubic (100) textured material, a polycrystalline tetragonal (001) textured material, wherein the polycrystalline cubic (100) textured material and the polycrystalline tetragonal (001) textured material each individually have an a-axis of about 4.1 Å to about 4.7 Å, and a (100) Heusler with a a-axis in the range of about 5.8 Å to about 6.6 Å disposed on the polycrystalline cubic (100) textured material or the polycrystalline tetragonal (001) textured material, a ferromagnetic layer, at least one barrier layer, a bismuth antimony (BiSb) layer having a (012) orientation, and a cap layer.

In yet another embodiment, a SOT device comprises a substrate, a seed layer disposed on the substrate, the seed layer comprising a polycrystalline material having a (111) orientation and an a-axis of about 3.53 Å to about 3.81 Å, a bismuth antimony (BiSb) layer having a (012) orientation, an interlayer, a ferromagnetic layer, at least one barrier layer, and a cap layer.

In another embodiment, a SOT device comprises a substrate, a seed layer disposed on the substrate, the seed layer comprising an amorphous or nanocrystalline material having a nearest neighbor x-ray diffraction peak d-spacing between about 2.02 Å to about 2.20 Å, a bismuth antimony (BiSb) layer having a (012) orientation, an interlayer, a ferromagnetic layer, at least one barrier layer, and a cap layer.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to spin-orbit torque (SOT) device comprising a bismuth antimony (BiSb) layer. The SOT device comprises a seed layer and a BiSb layer having a (012) orientation. The seed layer comprises at least one of an amorphous/nanocrystalline material with a nearest neighbor x-ray diffraction peak with a d-spacing in the range of about 2.02 Å to about 2.20 Å; a polycrystalline material having a (111) orientation and an a-axis of about 3.53 Å to about 3.81 Å; and a polycrystalline material having a cubic (100) or tetragonal (001) orientation and an a-axis of about 4.1 Å to about 4.7 Å. When the seed layer comprises an amorphous material or a polycrystalline material having a (111), the BiSb layer is doped, and the seed layer has a lower a/c ratio than when the seed layer comprises polycrystalline material having a cubic (100) or tetragonal (001) orientation.

Figure 1:
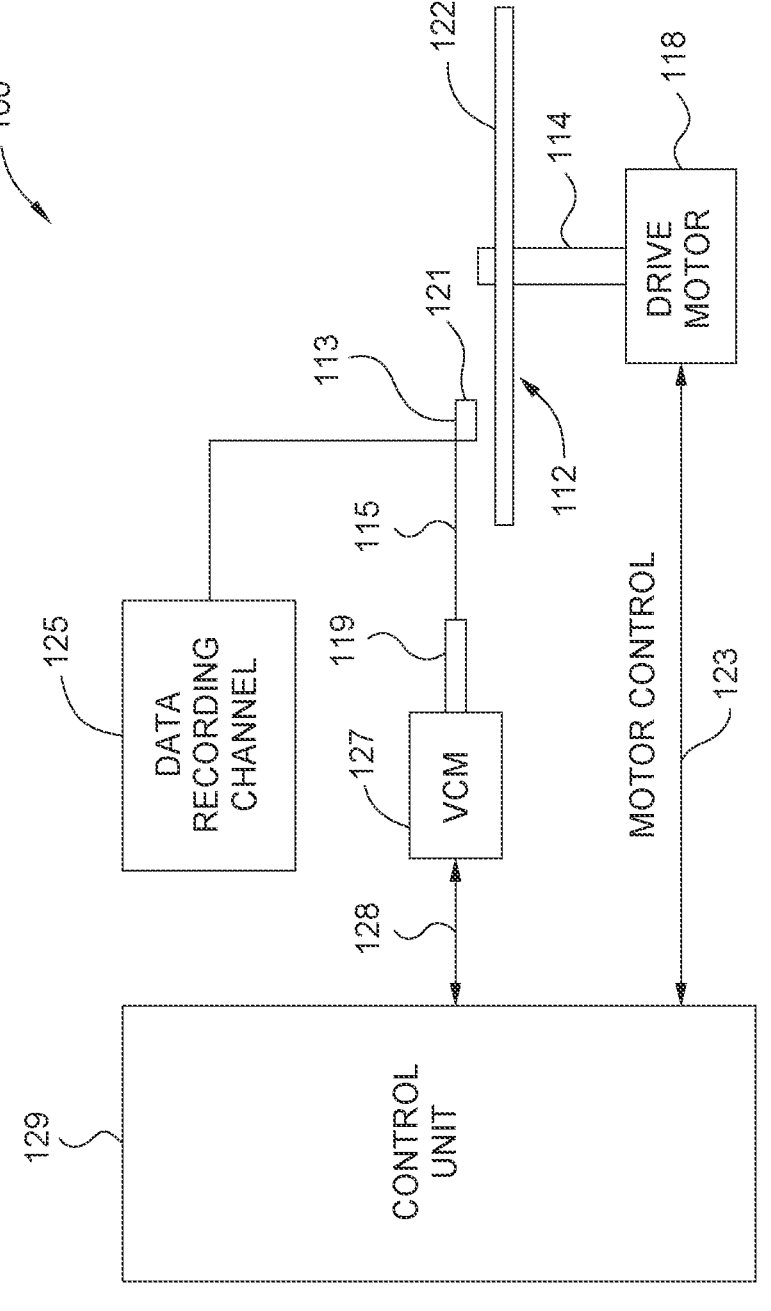
FIG. 1 is a schematic illustration of certain embodiments of a magnetic media drive including a write head having a SOT MTJ device.

FIG. 1 is a schematic illustration of certain embodiments of a magnetic media drive 100 including a write head having a SOT MTJ device. Such a magnetic media drive may be a single drive or comprise multiple drives. For the sake of illustration, a single disk drive 100 is shown according to certain embodiments. As shown, at least one rotatable magnetic disk 112 is supported on a spindle 114 and rotated by a drive motor 118. The magnetic recording on each magnetic disk 112 is in the form of any suitable patterns of data tracks, such as annular patterns of concentric data tracks (not shown) on the magnetic disk 112.

Figure 2:
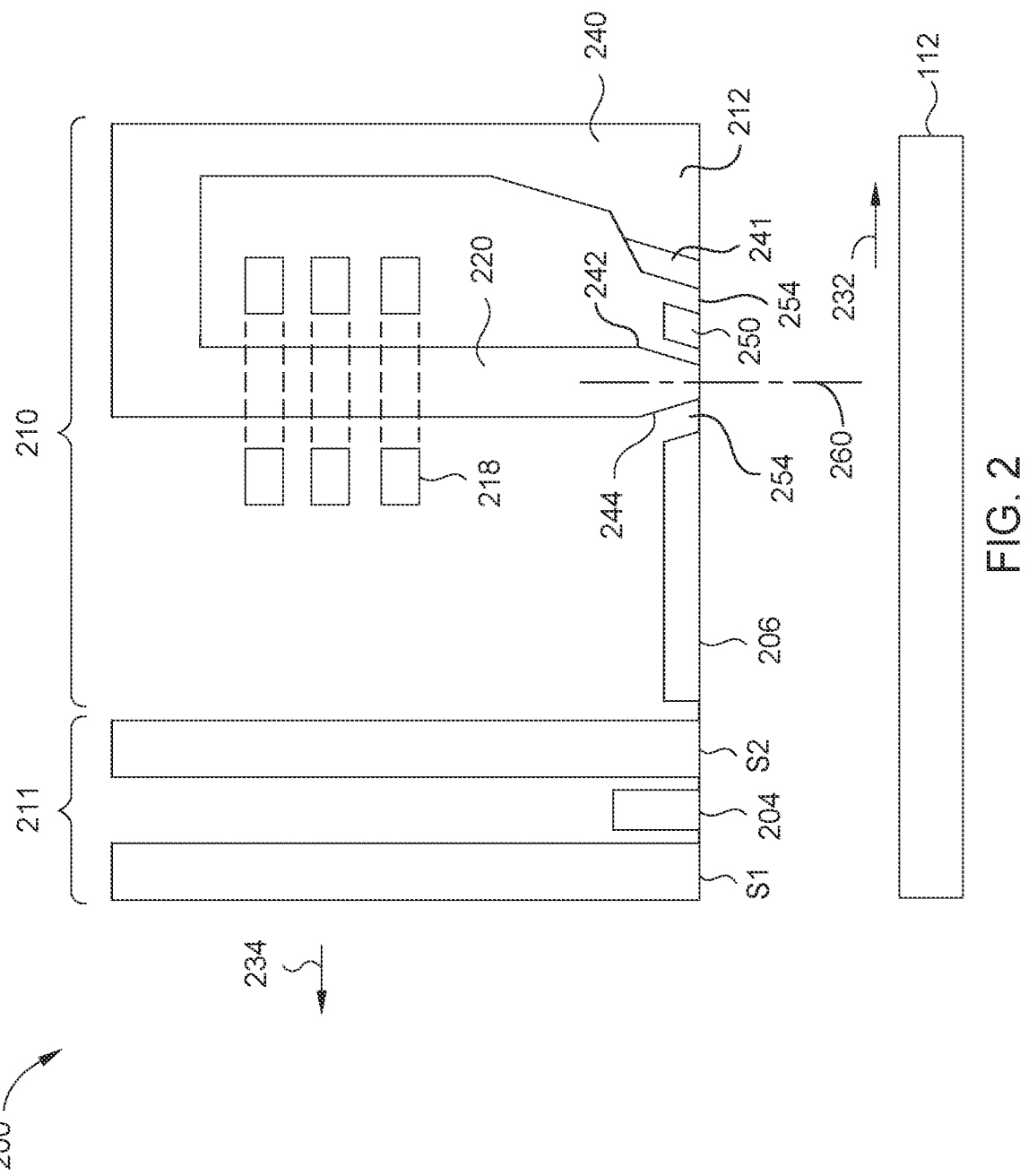
FIG. 2 is a fragmented, cross-sectional side view of certain embodiments of a read/write head having a SOT MTJ device.

At least one slider 113 is positioned near the magnetic disk 112, each slider 113 supporting one or more magnetic head assemblies 121 that include a SOT device. As the magnetic disk 112 rotates, the slider 113 moves radially in and out over the disk surface 122 so that the magnetic head assembly 121 may access different tracks of the magnetic disk 112 where desired data are written. Each slider 113 is attached to an actuator arm 119 by way of a suspension 115. The suspension 115 provides a slight spring force which biases the slider 113 toward the disk surface 122. Each actuator arm 119 is attached to an actuator means 127. The actuator means 127 as shown in FIG. 2 may be a voice coil motor (VCM). The VCM includes a coil movable within a fixed magnetic field, the direction and speed of the coil movements being controlled by the motor current signals supplied by control unit 129.

During operation of the disk drive 100, the rotation of the magnetic disk 112 generates an air bearing between the slider 113 and the disk surface 122 which exerts an upward force or lift on the slider 113. The air bearing thus counterbalances the slight spring force of suspension 115 and supports slider 113 off and slightly above the disk surface 122 by a small, substantially constant spacing during normal operation.

The various components of the disk drive 100 are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads on the assembly 121 by way of recording channel 125.

The above description of a typical magnetic media drive and the accompanying illustration of FIG. 1 are for representation purposes only. It should be apparent that magnetic media drives may contain a large number of media, or disks, and actuators, and each actuator may support a number of sliders.

FIG. 2 is a fragmented, cross-sectional side view of certain embodiments of a read/write head 200 having a SOT device. The read/write head 200 faces a magnetic media 112. The read/write head 200 may correspond to the magnetic head assembly 121 described in FIG. 1. The read/write head 200 includes a media facing surface (MFS) 212, such as a gas bearing surface, facing the disk 112, a write head 210, and a magnetic read head 211. As shown in FIG. 2, the magnetic media 112 moves past the write head 210 in the direction indicated by the arrow 232 and the read/write head 200 moves in the direction indicated by the arrow 234.

In some embodiments, the magnetic read head 211 is a magnetoresistive (MR) read head that includes an MR sensing element 204 located between MR shields S1 and S2. In other embodiments, the magnetic read head 211 is a magnetic tunnel junction (MTJ) read head that includes a MTJ sensing device 204 located between MR shields S1 and S2. The magnetic fields of the adjacent magnetized regions in the magnetic disk 112 are detectable by the MR (or MTJ) sensing element 204 as the recorded bits. The SOT device of various embodiments can be incorporated into the read head 211 as the sensing element. An example of an SOT read head is described in co-pending patent application titled "Topological Insulator Based Spin Torque Oscillator Reader," U.S. application Ser. No. 17/828,226, filed May 31, 2022, assigned to the same assignee of this application, which is herein incorporated by reference.

The write head 210 includes a main pole 220, a leading shield 206, a trailing shield 240, an optional spin orbital torque (SOT) device 250, and a coil 218 that excites the main pole 220. The coil 218 may have a "pancake" structure which winds around a back-contact between the main pole 220 and the trailing shield 240, instead of a "helical" structure shown in FIG. 2. When included, e.g., to achieve a Microwave Assisted Magnetic Recording (MAMR) effect, the SOT device 250 is formed in a gap 254 between the main pole 220 and the trailing shield 240. The main pole 220 includes a trailing taper 242 and a leading taper 244. The trailing taper 242 extends from a location recessed from the MFS 212 to the MFS 212. The leading taper 244 extends from a location recessed from the MFS 212 to the MFS 212. The trailing taper 242 and the leading taper 244 may have the same degree of taper, and the degree of taper is measured with respect to a longitudinal axis 260 of the main pole 220. In some embodiments, the main pole 220 does not include the trailing taper 242 and the leading taper 244. Instead, the main pole 220 includes a trailing side (not shown) and a leading side (not shown), and the trailing side and the leading side are substantially parallel. The main pole 220 may be a magnetic material, such as a FeCo alloy. The leading shield 206 and the trailing shield 240 may be a magnetic material, such as a NiFe alloy. In certain embodiments, the trailing shield 240 can include a trailing shield hot seed layer 241. The trailing shield hot seed layer 241 can include a high moment sputter material, such as CoFeN, FeXN, or FeX, where X includes at least one of N, Al, Ni, Co, Ta, Re, Ir, Pt, Rh, Ta, Zr, and Ti. In certain embodiments, the trailing shield 240 does not include a trailing shield hot seed layer.

Figures 3A, 3B:
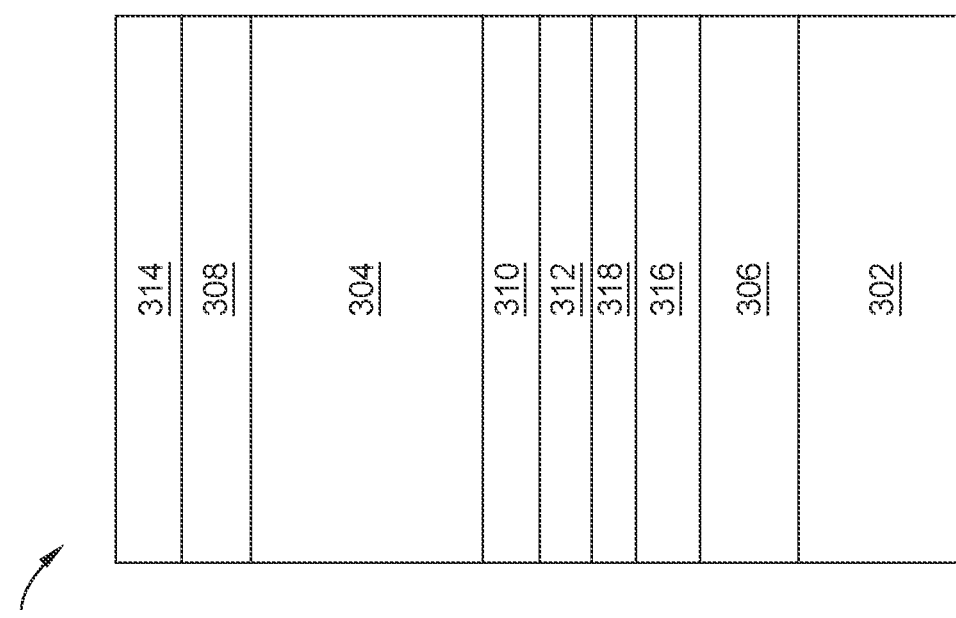
FIG. 3A illustrates a SOT MTJ device, according to one embodiment.
FIG. 3B illustrates a SOT MTJ device, according to another embodiment.

FIG. 3A illustrates a SOT device 300, according to one embodiment. The SOT device 300 comprises a substrate 302, an amorphous/nanocrystalline seed layer 306 disposed on the substrate 302, a BiSb layer 304 or BiSb layer stack 304 comprising with a crystal orientation of (012) disposed on the seed layer 306, an interlayer 308 disposed on the BiSb layer 304, a ferromagnetic (FM) layer 312 disposed on the interlayer 308, a barrier layer 310 disposed on the FM layer 312, and a cap layer disposed on the barrier layer 310. The seed layer 306 may be amorphous/nanocrystalline or polycrystalline, as discussed further below. The interlayer 308, the FM layer 312, the barrier layer 310, and the cap layer 314 may all be crystalline, or the interlayer 308, the FM layer 312, the barrier layer 310, and the cap layer 314 may be amorphous/nanocrystalline, or polycrystalline.

FIG. 3B illustrates a SOT device 350, according to another embodiment. The SOT device 350 comprises the substrate 302, the seed layer 306 disposed on the substrate 302, a texturing layer 316 disposed on the seed layer 306, an optional barrier layer 318 disposed on the texturing layer 316, the FM layer 312 disposed on the optional barrier layer 318 or on the texturing layer 316, the barrier layer 310 disposed on the FM layer 312, a BiSb layer 304 or BiSb layer stack 304 comprising with a crystal orientation of (012) disposed on the barrier layer 310, the interlayer 308 disposed on the BiSb layer 304, and the cap layer 314 disposed on the interlayer 308. In some embodiments, the texturing layer 316 is considered a part of the seed layer 306. The seed layer 306 may be amorphous or polycrystalline, as discussed further below. The interlayer 308 and the cap layer 314 may be crystalline or amorphous. In some embodiments, a buffer layer (not shown) may be disposed between the barrier layer 310 and the BiSb layer 304.

Figures 3C, 3D:
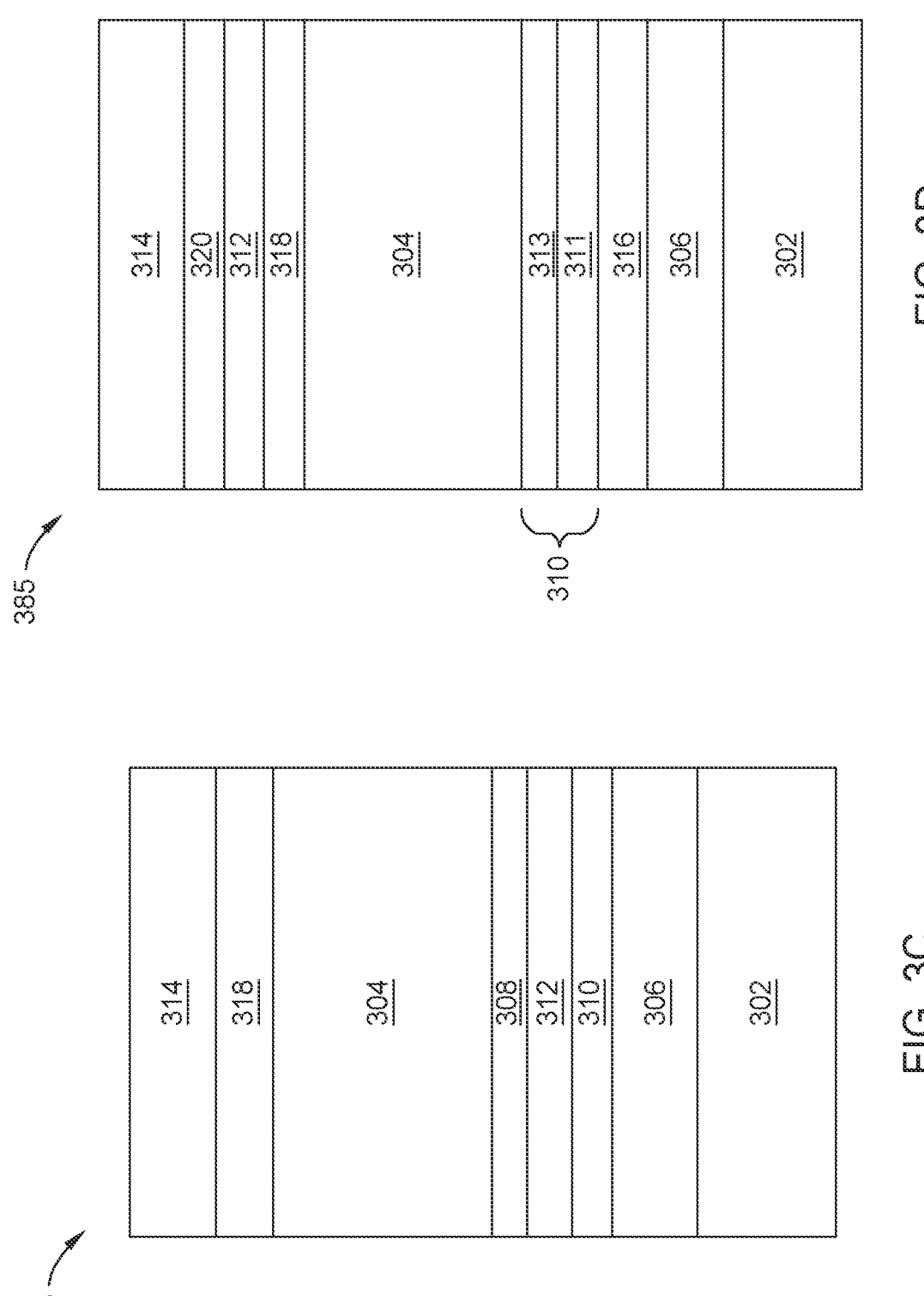
FIG. 3C illustrates an SOT device, according to yet another embodiment.
FIG. 3D illustrates an SOT device, according to another embodiment.

FIG. 3C illustrates an SOT device 375, according to yet another embodiment. The SOT device 375 comprises the substrate 302, the seed layer 306 disposed on the substrate 302, a first barrier layer 310 disposed on the seed layer 306, the FM layer 312 disposed on the first barrier layer 310, the interlayer 308 disposed on the FM layer 312, the BiSb layer 304 or BiSb layer stack 304 disposed on the interlayer 308, a second barrier layer 318 disposed on the BiSb layer 304, and a cap layer disposed on the second barrier layer 318. The seed layer 306 may be amorphous or polycrystalline, as discussed further below. The interlayer 308 and the cap layer 314 may be crystalline or amorphous.

FIG. 3D illustrates an SOT device 385, according to another embodiment. The SOT device 385 comprises the substrate 302, the seed layer 306 disposed on the substrate 302, the texturing layer 316 disposed on the seed layer 306, a first barrier layer 310 disposed on the texturing layer 316, the first barrier layer 310 comprising a first sublayer 311 and a second sublayer 313, the BiSb layer 304 or BiSb layer stack 304 disposed on the second sublayer 313 of the first barrier layer 310, a second barrier layer 318 disposed on the BiSb layer 304, the FM layer 312 disposed on the second barrier layer 318, an optional third barrier layer 320 disposed on the FM layer 312, and a cap layer 314 disposed on the optional third barrier layer 320 or on the FM layer 312. In some embodiments, the texturing layer 316 is considered a part of the seed layer 306. The seed layer 306 may be amorphous or polycrystalline, as discussed further below. The cap layer 314 may be crystalline or amorphous.

The substrate 302 can be a silicon substrate or an alumina substrate. The silicon substrate 302 has a cubic structure of (111), (100), (001), or other crystal orientations. The alumina substrate 302 has a hexagonal structure with (001) orientations or with other crystal orientations or has an amorphous structure. The substrate 302 can be a bare substrate or can have one or more layers formed thereover, such as an oxide layer thermally grown or deposited thereover.

The FM layer 312 may comprise CoFe and have a thickness of about 5 Å to about 100 Å. The barrier layers 310, 318, 320, including the first and second sublayers 311, 313, may each individually comprise MgO, MgTiO, or any suitable high resistance oxide, nitride, or carbide with similar lattice parameters, and have a thickness of about 2 Å to about 20 Å. The cap layer 314 may comprise high resistance amorphous or crystalline metal layers such as NiFeGe, NiFeGe/Ru, NiFeTaN, oxidized NiFeTaN, or high resistance amorphous or crystalline oxide, nitrides or carbides, and have a thickness of about 5 Å to about 200 Å. (It is noted that in this disclosure, "/" denotes separate layers in a multi-layer stack and not the conjunctive "or.") In some embodiments, the cap layer 314 may comprise RuAl/Ru or NiFeGe/Ru. The texturing layer 316 may comprise amorphous pre-seed layers such as NiFeGe or NiFeTa, as well as texturing layers like RuAl, CrMo, IrAl, CoAl, heated Cr, or CrX alloys, where X is about 10% of Ti, W, Ru, or Mo. The texturing layer 316 may have a thickness of about 10 Å to about 100 Å. The BiSb layer 304 comprises BiSb or BiSbX, where X is a dopant. The dopant may be one or more of B, N, Al, Si, Ti, V, Cr, Fe, Ni, Cu, Ge, Y, Zr, Mo, Ru, Y, Zr, Hf, Ta, W, and Ag. The BiSb layer 304 may have a thickness of about 50 Å to about 200 Å. The seed layer 306 may have a thickness of about 5 Å to about 200 Å. The interlayer 308 may comprise NiFeGe, Ge, or combinations thereof, a non-magnetic material such as RuAl, NiAl, Cr, V, Ti, MgO, MgTiO, or other Heusler, B2, or bcc (body-centered cubic) alloy combinations thereof, and have a thickness of about 5 Å to about 50 Å.

In some embodiments, the seed layer 306 and the interlayer 308 comprise the same material. For example, like shown in FIGS. 3A-3B, the seed layer 306 and the interlayer 308 may each individually comprise a single layer of a crystalline or amorphous material. In another example, the seed layer 306 and the interlayer 308 may each individually comprise multiple layers of crystalline and/or amorphous materials. In another embodiment, the seed layer 306 and the interlayer 308 each individually comprises one or more different materials. The seed layer is used to grow the BiSb of the BiSb layer 304 a crystal orientation of (012).

Strong BiSb (012) texture can be epitaxially grown from a strong (111) polycrystalline fcc textured seed layer 306 with fcc a-axis in the range of about 3.53 Å to about 3.81 Å, where the epitaxy is formed globally across the entire film surface. For example, the seed layer 306 may comprise Nix, CuX, CoX, where X is one or more elements of: Al, Ti, V, Cr, Fe, Co, Ni, Cu, Ru, Rh, and Pt; or bilayer and multilayer stacks like NiFe/Cu, NiFeCr/NiFe, etc.

Historically, given the approximately square lattice of the BiSb (012) surface, BiSb has been grown on 4-fold symmetric single crystal or (100) polycrystalline textured films. However, E. Walker et. al. (Phys., Rev. Materials 3, 2019), showed that the (012) orientation could also be grown on a 3-fold (111) single crystal substrate of Si. This can be done either as thin Bi films (Bi has the same lattice structure just slightly different a and c axes than BiSb SOT films), or with BiSb films with Sb>~9 at. % of any thickness.

Figures 4A, 4B, 4C:
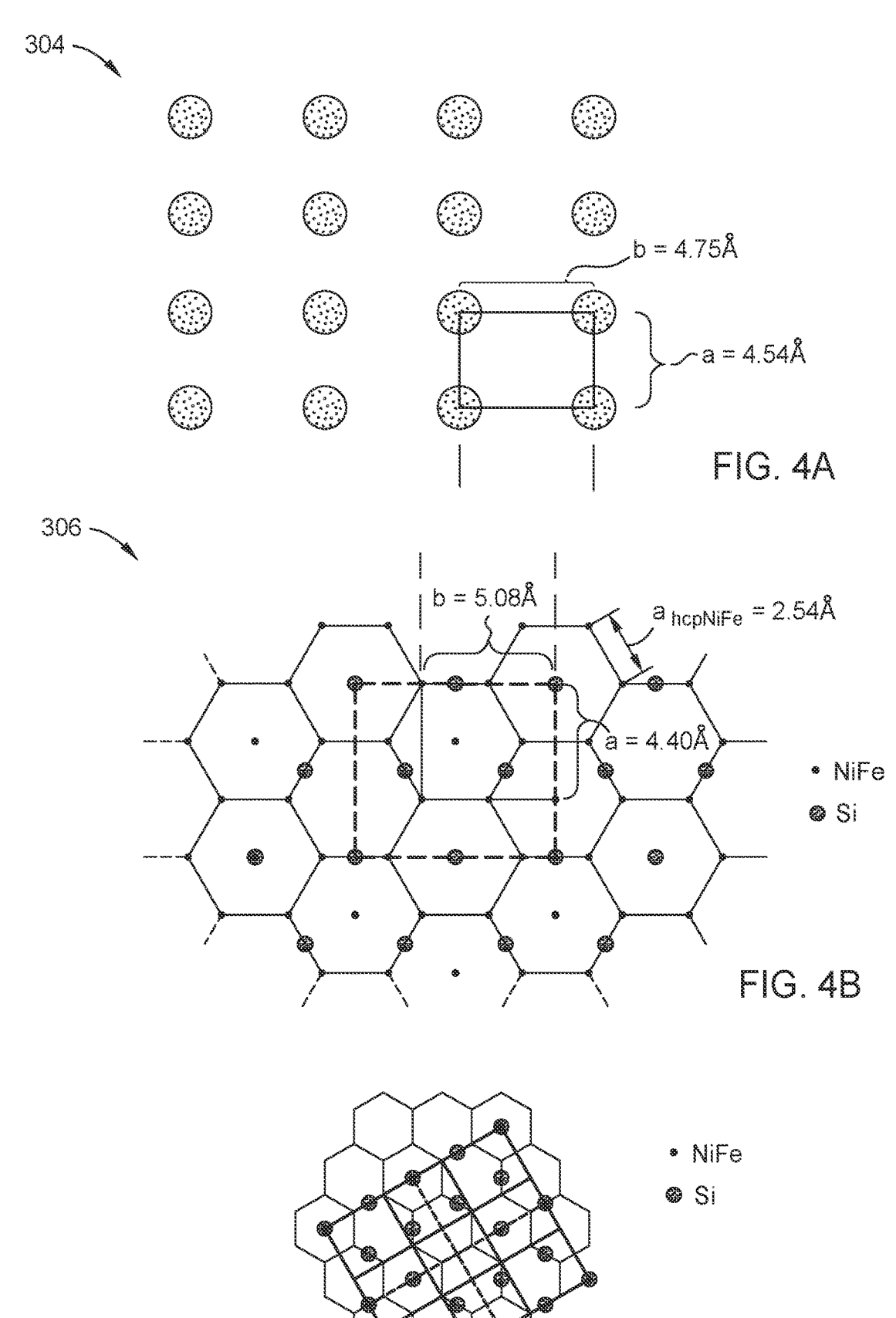
FIG. 4A illustrates the lattice structure of BiSb (012) of the BiSb layer of FIGS. 3A, 3B, 3C, and/or 3D.
FIGS. 4B-4C illustrate the lattice structure of NiFe (111) and Si (111) of a seed layer.

FIG. 4A illustrates the lattice structure of BiSb (012) of the BiSb layer 304. FIGS. 4B and 4C each illustrate the lattice structure of NiFe (111) (Ni, Fe atoms small dots) of the seed layer 306 overlaid with Si (111) surface (Si atoms large dots), which as shown by Walker et al. is effective at producing the (012) orientation. It can be seen in FIGS. 4B and 4C that the Si (111) hexagonal surface can be represented as a rectangular lattice (thick dashed line rectangle) which is nearly equivalent to $\frac{3}{2}$ (1.5×) times that of the NiFe (111) rectangular surface lattice (solid line rectangle nested within the thick dashed line rectangle), within 0.8% mismatch, such that a 2×2 cell of Si (111) rectangular surface lattice (dashed line rectangle here showing one cell) has a direct lattice match to a 3×3 cell of NiFe (111) rectangular surface lattice (solid line rectangle here showing one cell). This explains why Si (111) substrates can grow Cu (111), NiFe (111) textured films or textured alloy films that predominately contain Cu or Ni.

As shown in FIG. 4A, BiSb (012) has a rectangular surface with dimensions of a=about 4.54 Å and b=about 4.75 Å. Comparatively, in FIG. 4B, NiFe (111) can be configured to have a rectangular surface with dimensions of about a=4.40 Å and about b=5.08 Å. Thus, the NiFe (111) surface lines up with the approximate rectangular BiSb (012) surface with about 3% mismatch in the 'a' direction and about a 7% mismatch in the 'b' direction, and such lattice matching explains why Walker et al.'s Si (111) texture can grow BiSb (012) texture. Therefore, a (111) textured NiFe thin film can be used as part of a seed layer 306 to grow (012) textured BiSb layer 304. In fact, any strong (111) textured fcc polycrystalline thin film with a-axis lattice parameters in the range of about 3.53 Å to about 3.81 Å, or strong (002) textured hcp film with a hexagonal $a_{hcp}$ axis in the range of about 2.50 Å$<a_{hcp}<$2.69 Å, will grow a BiSb (012) textured film. Examples of the (002) materials include textured films of Co (002), Zn (002), BN (002). Examples of the (111) materials include NIX, CuX, CoX alloys, where X is one or more elements of Al, Ti, V, Cr, Fe, Co, Ni, Cu, Ru, Rh, and Pt; or in bilayers or multilayers of these compounds like NiFe/Cu, NiFeCr/NiFe, etc.

Additionally, (111) textured materials with approximately $\frac{3}{2}$ times larger lattice parameters like Si, Ge, $Si_xGe_{1-x}$, (111) textured materials with space group 227 (cF8), and space group 225 (cF12) (111) textured $CoSi_2$, $NiSi_2$, films etc., with an fcc a-axis parameter in the range of about 5.25 Å to about 5.65 Å, can also be used to grow BiSb (012) textured films as outlined in FIG. 4B.

Depositions of Si, Ge, $SiGe_x$, and metal disilicides thin films at near room temperature (RT) do not have a long range polycrystalline order but are amorphous to nanocrystalline thin films with larger nearest neighbor distances (about $\frac{3}{2}$ larger than those amorphous/nanocrystalline metal alloy materials defined above with nearest neighbor x-ray diffraction peaks in the range of 2.02 Å to 2.20 Å, that produce strong (012) textured films). For example, a-Ge's ("a-" meaning amorphous) x-ray nearest neighbor diffraction peak is 3.26 Å, which is $\frac{3}{2}$ larger than 2.17 Å, the nearest neighbor diffraction d-spacing of NiFeTa40, which is a known amorphous/nanocrystalline seed layer to grow textured BiSb (012). However, inventors have discovered that a-Si, a-Ge, a-$Si_xGe_y$ (where x and y are numerals) alloy films, if used as seed layers for the BiSb SOT layer 304, can also produce a strong (012) textured BiSb film. The inventors have further discovered that amorphous Si can produce a (012) BiSb texture but needs a very thin metal buffer actin as a barrier in between (e.g., >about 2 Å for metal buffers of Cu or NiFe) between a-Si and BiSb. Si does interact with BiSb at RT and severely reacts at higher temperatures, so a thin barrier is needed to reduce the reaction. However, a-Ge seed layer produces a robust (012) BiSb texture and is non-reactive with the BiSb SOT layer 304. This is explained in the idea of a spatially correlated extremely local hexagonal surface cluster structure matching to the BiSb (012) rectangular surface as outlined in FIG. 4B.

Metal-disilicide films are also amorphous/nanocrystalline materials with low resistance (high shunting), and require high temperatures to be polycrystalline, and therefore are not useful for seed layers or interlayers with BiSb. However, metal monosilicides, or in general, metal silicides or metal germanides, are high resistance amorphous/nanocrystalline materials with nearest neighbors x-ray diffraction peaks in the range of 2.02 Å to 2.20 Å and do produce strong (012) BiSb texture. While silicides and germanides are thermally stable to >400° C., metal silicides do react with BiSb at elevated temperatures, but metal germanides have very limited reaction and are highly suited as seed layers, interlayers, and capping layers of SOT BiSb devices.

Strong BiSb (012) texture can also be produced using local hexagonal clustering of atoms in an amorphous seed layer 306's surface, provided the hexagonal nature of the cluster is in a certain size range based on the locally averaged nearest neighbor distance of the atoms in an amorphous or nano-crystalline seed layer. Such locally clustering can be thought of as approximately forming a local pseudo-crystalline (111) surface which locally fits the BiSb (012) surface. For example, materials having an amorphous nearest neighbor diffraction peak spacing of about 2.02 Å to about 2.20 Å, an approximate $a_{hcp}$ spacing of about 2.50 Å to about 2.69 Å, and an approximate $a_{hcp}$ spacing of about 3.53 Å to about 3.81 Å. Examples of such materials include NiFeTax, where 27 at. % Ta<x<at.37% Ta, and NiFeWx, where 19 at. % W<x<40 at. % W. Additional materials that can be utilized include CoFeSiy and NiFeSiy alloys, where y is at. % of Si to make the alloy or material non-magnetic, and CoFeGex and NiFeGex alloys, where x is larger than 44 at. % Ge (nonmagnetic). By extension, other suitable examples include amorphous materials with ½ larger nearest neighbor diffraction peak spacings, which may include examples like a-Si, a-Ge, a-Si—Ge alloys.

Figure 5A:
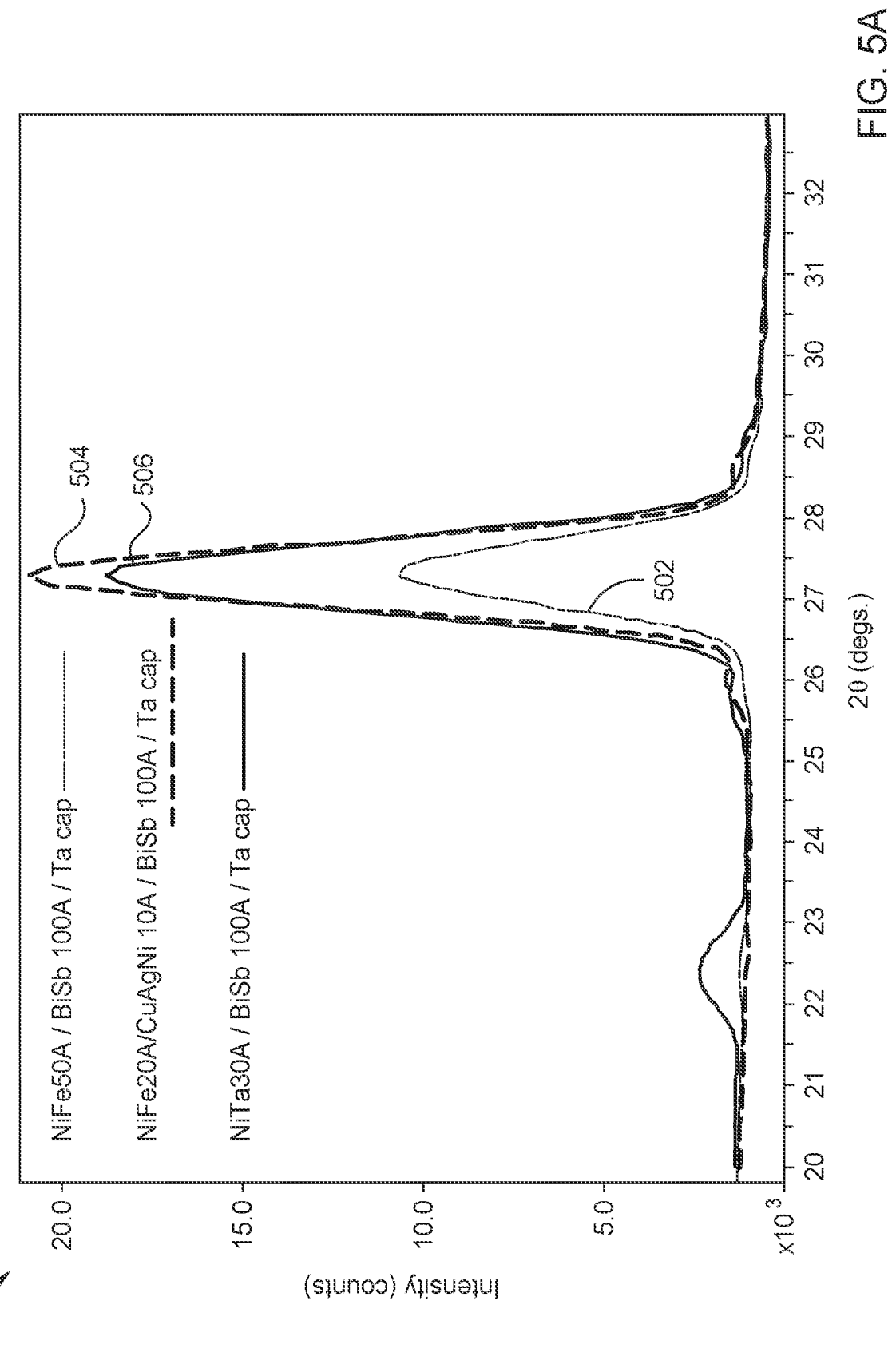
FIGS. 5A-5C illustrate graphs comparing various seed layer materials, according to various embodiments.
Figure 5B:
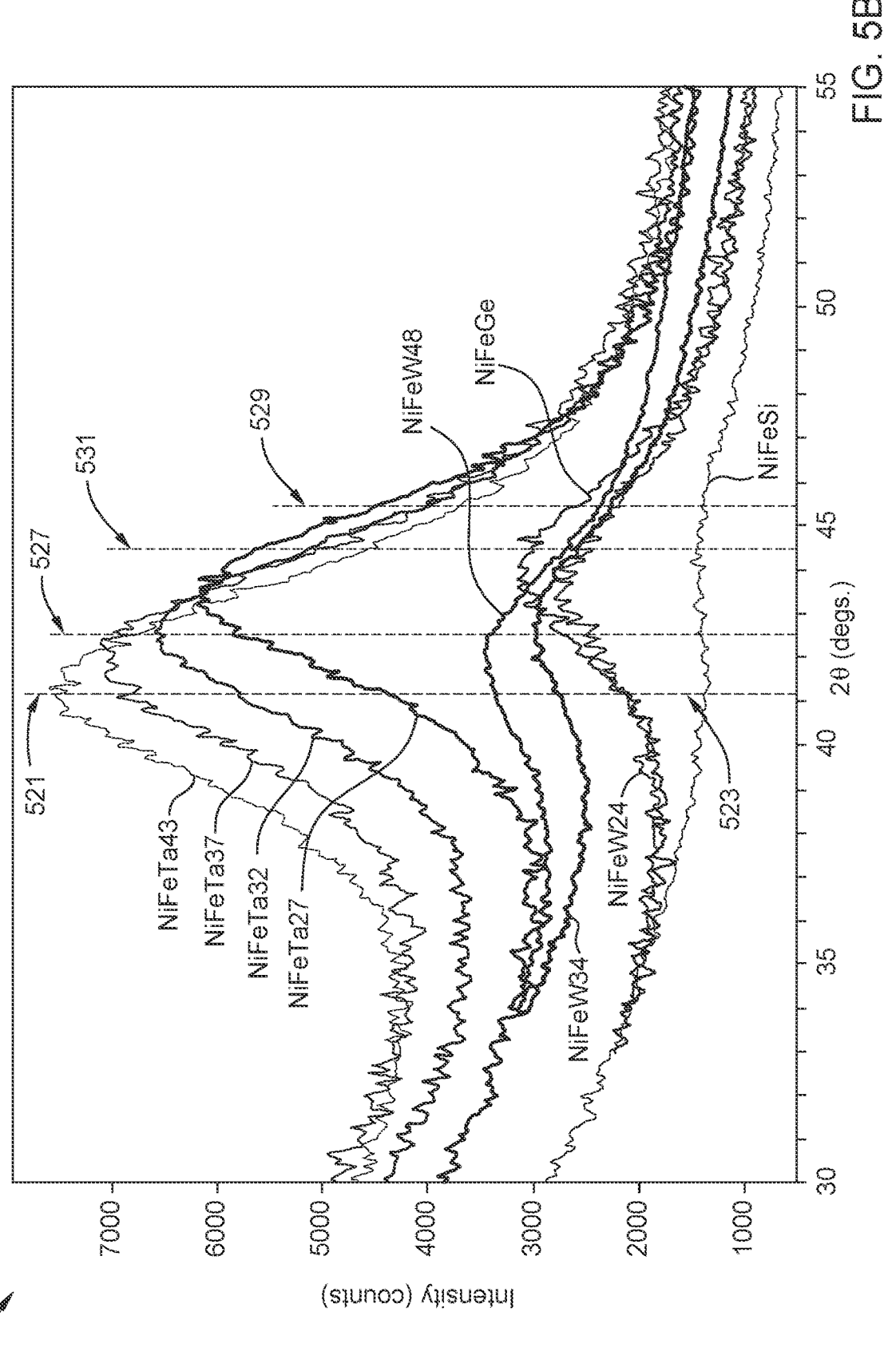
Figure 5C:
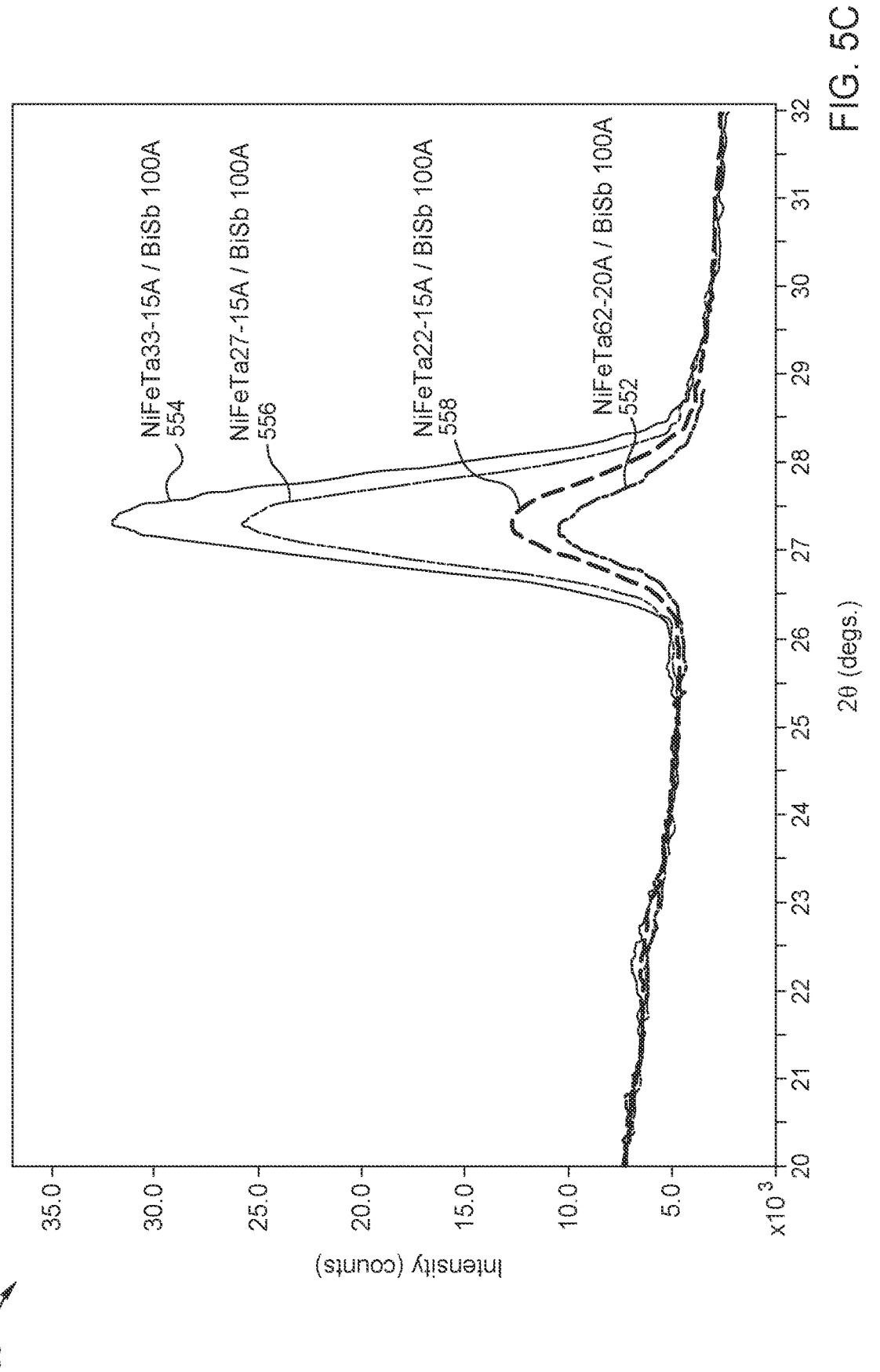

FIGS. 5A-5C illustrate graphs 500, 525, 550, respectively, comparing various seed layer 306 materials, according to various embodiments. In the graphs 500, 525, and 550, the y-axis represents peak intensity in counts, and the x-axis represents degrees, where a peak intensity of about 27 degrees indicates strong results. In FIG. 5A, line 502 represents a seed layer 306 comprising NiFe having a thickness of about 50 Å, a BiSb layer 304 disposed on the seed layer 306 having a thickness of about 100 Å, and a cap layer 314 comprising Ta disposed over the BiSb layer 304; line 504 represents a seed layer 306 comprising NiFe having a thickness of about 20 Å and CuAgNi having a thickness of about 10 Å, a BiSb layer 304 disposed over the seed layer 306 having a thickness of about 100 Å, and a cap layer 314 comprising Ta disposed over the BiSb layer 304; and line 506 represents a seed layer 306 comprising NiTa having a thickness of about 30 Å, a BiSb layer 304 disposed on the seed layer 306 having a thickness of about 100 Å, and a tap layer 314 comprising Ta disposed over the BiSb layer 304.

As shown in the graph 500, line 502 representing a seed layer 306 comprising NiFe (50 at. % of Fe) having a thickness of about 50 Å achieves a moderately good (012) orientation. Line 504 further has the lowest roughness (about 12 Å), resulting from better epitaxial growth of the BiSb (012) layer 304 but does have a minor (001) BiSb component of texture. Line 506 shows a moderately strong (012) BiSb layer 304 using an amorphous NiTa layer with a Ta concentration of 43 at. %.

The graph 525 of FIG. 5B shows the x-ray diffraction patterns of various amorphous/nanocrystalline alloy compositions of NiFeTa, and NiFeW, where the nearest neighbor distance of the local hexagonal network can be changed by varying the composition of the larger atom in the alloy. In this case, varying Ta and W in the NiFeX alloys (X=Ta or W). The nearest neighbor diffraction peak was scanned from about 2.07 Å to about 2.19 Å by varying Ta concentration from 27 at. % to 43 at. % and from 2.07 Å to 2.15 Å or by varying W from about 24 at. % to 48 at. %. By varying the nearest neighbor distance, the effect this distance has on local texturing of BiSb (012) can be observed.

In FIG. 5B, the peak 521 near the nearest neighbor x-ray diffraction peak of $NiTa_{43}$ represents an example of the largest useful nearest neighbor diffraction peak spacing for growing BiSb (012) texture. The vertical line 523 at the nearest neighbor diffraction peak of NiFeSi represents about the lowest useful range for producing BiSb (012) texture and constitute the approximate range 2.02 Å to 2.20 Å for the nearest neighbor x-ray diffraction peak spacing of the amorphous/nanocrystalline material to grow BiSb (012) textured films. The vertical lines 527, 529 representing the best fit to the average surface length of the BiSb (012) rectangular surface is near the middle of the range of both Ta and W compositional profiles. The diffraction patterns of amorphous/nanocrystalline NiFeGe and NiFeSi which yield BiSb (012) textured films can also be observed in the graph 525.

The last vertical line 531 in the graph 525 represents a Cu (111) or CuAgNi (111) peak position, which have been used previously to establish (012) BiSb, for comparison purposes. For example, Cu or a CuAg alloy with an atomic percent content of silver from greater than zero to about 18%, which are fcc materials with a (111) orientation having an a-axis from about 3.60 Å to about 3.71 Å, as well as CuX and CuNix, where X=Cr, Ag, Pt, Ir, Rh, Al, Mn, were all previously found to grow BiSb in a (012) orientation. As shown in the graph 525, $NiTa_{43}$, $NiTa_{37}$, and $NiTa_{32}$ all achieve higher peak intensities than Cu (111) or CuAgNi (111).

In FIG. 5C, line 552 represents a seed layer 306 comprising $NiFeTa_{62}$ having a thickness of about 20 Å, and a BiSb layer 304 disposed on the seed layer 306 having a thickness of about 100 Å; line 554 represents a seed layer 306 comprising $NiFeTa_{33}$ having a thickness of about 15 Å, and a BiSb layer 304 disposed on the seed layer 306 having a thickness of about 100 Å, line 556 represents a seed layer 306 comprising $NiFeTa_{27}$ having a thickness of about 15 Å, and a BiSb layer 304 disposed on the seed layer 306 having a thickness of about 100 Å; and line 558 represents a seed layer 306 comprising $NiFeTa_{22}$ having a thickness of about 15 Å, and a BiSb layer 304 disposed on the seed layer 306 having a thickness of about 100 Å.

As shown in the graph 550 of FIG. 5C, line 554 representing a seed layer 306 comprising $NiFeTa_{33}$ having a thickness of about 15 Å achieves the strongest (012) orientation. This agrees well with the vertical line 527 in the graph 525 FIG. 5B, which best lattice matches to the average BiSb (012) rectangular length spacing, and supports the idea of local texturing of hexagonal surfaces in amorphous/nanocrystalline materials as seeds layers to grow (012) textured films of BiSb, and the need to require a nearest neighbor distance or x-ray diffraction peak spacing range for this texture.

Seed layers 306 comprising a (111) polycrystalline material or an amorphous or nano-crystalline material rely on matching the rectangular BiSb (012) surface to the (111) rectangular or hexagonal surface formed by two or more adjacent hexagons of either a long range crystalline (111) fcc surface or a local cluster of hexagons forming a pseudo-crystalline (111) surface locally. Doping the BiSbX, where X is the dopant selected from a variety of elements and alloys, increases the c-axis of BiSbX relative to the a-axis of BiSbX, thus reducing the a/c axis ratio of BiSbX, which makes the (012) rectangular surface more rectangular and significantly improves the (012) texture of BiSbX layer, as discussed in FIGS. 6A-6B below. The BiSb layer 304 may be doped with the dopant X selected from one or more of: B, N, Al, Si, Ti, V, Cr, Fe, Ni, Cu, Ge, Y, Zr, Mo, Ru, Y, Zr, Hf, Ta, W, and Ag.

Figure 6A:
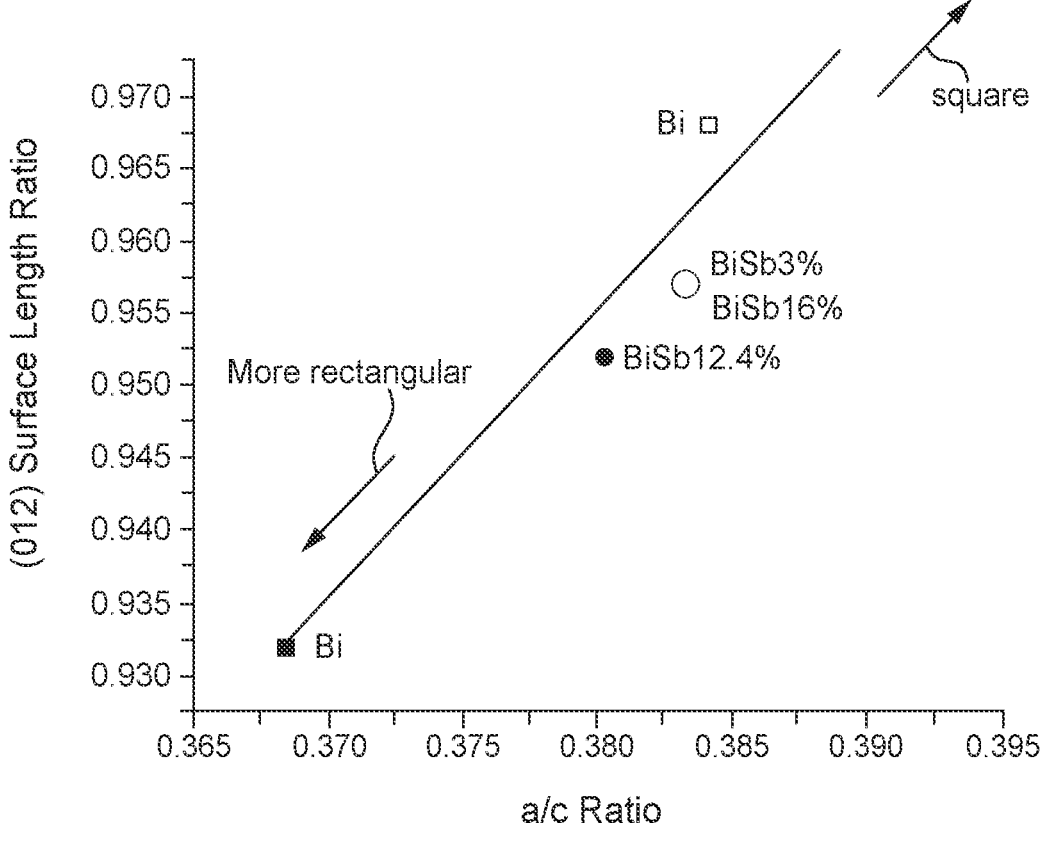
FIG. 6A illustrates the (012) surface length ratio of BiSb versus the a/c ratio of the BiSb layer, according to one embodiment.
Figure 6B:
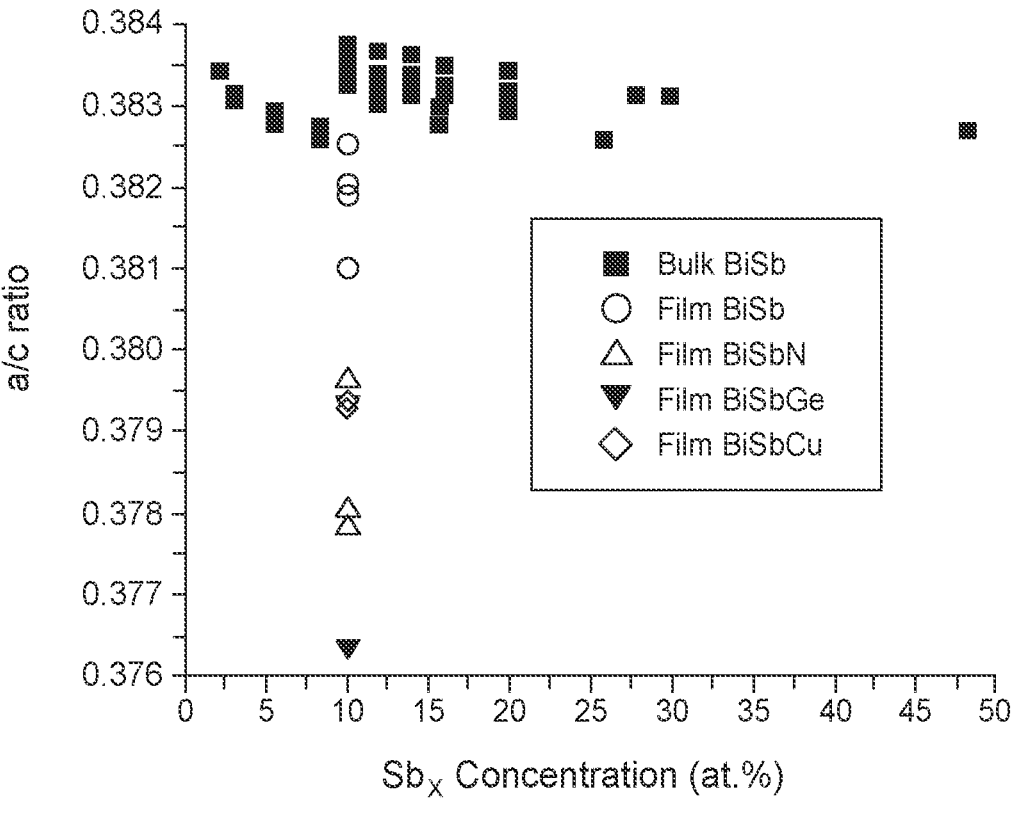
FIG. 6B illustrates the a/c ratio of BiSb versus the Sb concentration (atomic percent (at. %)) within BiSb, according to one embodiment.

FIG. 6A illustrates the (012) surface length ratio of BiSb versus the a/c ratio of the BiSb layer 304 for various bulk BiSb alloys. The first two rows of the chart in FIG. 6A represent BiSb having 0 at. % of Sb being prepared using different methods to achieve different results. FIG. 6B illustrates the a/c ratio of BiSb versus the Sb concentration. The Sb concentration of at.10%+/−1% shows that the a/c ratio is dropping significantly with the various dopants. The BiSb 10 at. % Sb target is either co-sputtered or laminated with dopant X so that X has a concentration of about 3 at. % to about 5 at. %. Plotted in FIG. 6B are the undoped BiSb bulk alloys (square points) and doped and undoped thin films (undoped: circle, N-doped: up triangle, Ge-doped: down triangle, CuAgNi-doped: diamond). For undoped bulk BiSb, the a/c ratio is about 0.383 and a rectangular surface ratio is about 0.956, which is a more square looking rectangular surface than that of a (111) surface which has 0.866 rectangular surface ratio. As shown in FIG. 6B, doping BiSb with a dopant X, where X is one or more of Ge, N, Si, Cr, Fe, Ni, Cu, Ag, and Ta, generally decreases the a/c ratio of the BiSbX.

From FIG. 6A, a smaller a/c ratio yields a more rectangular (012) surface. This then allows the doped BiSbX to better lattice match to seed layer 306 comprising (111) polycrystalline materials with a rectangular surface ratio of 0.866, and to the local rectangular surface formed through local hexagonal clustering of amorphous or nano-crystalline materials. For example, fcc (111) materials have a surface length ratio of about 0.866. Lowering the a/c ratio of the BiSbX allows the BiSbX to better lattice match the fcc (111) surface, by reducing the surface ratio to about 0.945, which in turn improves the (012) texture of the BiSbX layer 304.

For epitaxial texturing of BiSb to a (100) cubic textured seed or (001) tetragonal seed layers discussed above, it is advantageous to have an undoped BiSb SOT layer 304 to have a more square (012) surface, and hence requiring a higher a/c ratio for better epitaxy to (100), (001) textured seed. Since the c-axis decreases more than twice the rate of the a-axis with increasing Sb concentration, the a/c ratio can be slightly increased by about 0.005 in the BiSb layer 304 if the Sb concentration increases from about 10% Sb to about 20% Sb. Doping BiSb would not in general help, as this would decrease the a/c ratio. Thus, finding dopants that will contract the c-axis relative to the a-axis of BiSbX would be in general beneficial in growing textured (012) BiSb on (100) textured seed layers which are used in SOT stacks, or for epitaxial growth with a (001) tetragonal seed as discussed above. Such a dopant would better match to cubic (100) and tetragonal (001) textured seed layer surfaces with an a-axis in the range of 4.1 Å to 4.7 Å. In general, most dopants decrease the a/c ratio; however this might be accomplished by using extremely small dopants like Boron (B) or large dopant atoms like Barium (Ba) as interstitial dopant atoms in the BiSb lattice.

Referring back to the SOT device 300 of FIG. 3A or the SOT device 375 of FIG. 3C, for example, utilizing a seed layer 306 comprising a (111) polycrystalline material or an amorphous or nano-crystalline material results in the doped BiSbX layer 304 being grown with a strong (012) orientation. Growing the BiSb layer 304 with a strong (012) orientation lowers the roughness of the BiSbX layer 304.

In FIGS. 3B and 3D, a strong BiSb (012) texture of the BiSb layer 304 can also be obtained with low interfacial roughness by epitaxial or polycrystalline epitaxial growth using seed layers 306 and/or texturing layers 316 having a (100) cubic or (001) tetragonal textured growth. An example can be to use a seed layer 306 comprising an amorphous seed layer and a (100) texturing layer 316 comprising (1) RuAl, (2) CrMo, (3) IrAl, (4) CoAl, (5) heated Cr, or (6) CrX alloys, where X is about 10 at. % of Ti, W, Ru, or Mo. The texturing layer 316 may be comprised of multiple layers having a total thickness of about 10 Å to about 100 Å, and contain other (100) textured bcc or B2 layers with an a-axis in the range of 2.86 Å to 3.31 Å, or textured (100) fcc layers, or textured (001) tetragonal layers with an a-axis in the range of 4.1 Å to 4.7 Å.

The (100) textured bcc or B2 layers may comprise: V, Nb, Mo, W, Ta, Cr, RuAl, NiAl, RhAl, or alloy combinations thereof with one or more elements selected from the group consisting of: Ti, Al, Pt, Ni, Co, Fe, and Cr. The (100) textured fcc layers space group 225 (Fm-3m) may comprise: mono-oxides of Sc, Ti, V, Mn, Fe, Ni, Mg, or Zr; mono-carbides of Sc, Ti, V, Nb, Zr, Hf, Ta, or W; mono-nitrides of Sc, Ti, V, Cr, Nb, Zr, Hf, or Ta; or composite alloys thereof. Cubic Zinc Blende structures of FeN and ZnO space group 216 are also included in the list of (100) cubic materials. The (001) textured tetragonal layers space group 136 (P42/mmm) may comprise the dioxides of Ti, V, Cr, Ge, Ru, Rh, Sn, Sb, or Ir, for example.

The FM layer 312 may comprise CoFe or other bcc or B2 magnetic materials of similar lattice parameters, and have a thickness of about 5 Å to about 100 Å. The barrier layers 310, 318, 320 may individually comprise MgO, MgTiO, the texturing layers discussed above, or full or half Heusler alloys (magnetic or non-magnetic), and have a thickness of about 2 Å to about 20 Å. Heusler alloys have larger lattice parameters in the approximate range of 5.8 Å to 6.6 Å with space group 225 or 216. The square lattice of (100) bcc, B2, (100) fcc cubic, and (001) tetragonally textured seed layers with an a-axis lattice parameters in the range of 4.1 Å to 4.7 Å can have their (100), (001) surfaces rotated in the plane 45 degrees (sqrt2) and lattice match (100) textured Heusler alloys with an a-axis lattice parameters in the range of 5.8 Å to 6.6 Å. The BiSb SOT layer 304 is likely undoped, or has a higher Sb concentration, or with a specially doped BiSbX, where X-dopant yields a higher a/c axis ratio for better lattice matching.

The interlayer 308 may be a higher resistivity nonmagnetic metal, oxide, nitride, or carbide discussed above in the texturing layer. The cap layer 314 can be a higher resistance amorphous/nanocrystalline material like NiFeX, CoFeX (where X is at least one of Sc, Ti, V, Cr, Mn, Fe, Co, Ni, Cu, Ge, Zr, Y, Ta, Re, Pt, W, Hf, and Ir), Ge, Ru, Pt, Rh, Ir, or alloy combinations thereof, or crystalline material found in the texturing or barrier layer descriptions above.

As discussed above in FIG. 6A, most dopants expand the c-axis of BiSbX relative to the a-axis and make the BiSbX (012) more rectangular, which fails to match well with the square lattice of (100) cubic or (001) tetragonal seed layer growth, and higher length aspect ratios are needed for better epitaxy. The a/c ratio can be increased slightly in the SOT films stacks to improve slightly the epitaxy to (100) cubic or (001) tetragonal seeds by designing film stacks with in-plane strain anisotropy or by increasing the Sb concentration to the Sb concentration to the 15% to 20% range for the undoped BiSb SOT layer 304 as mentioned above. However, this increase is expected to at best increase the a/c ratio by 0.005, and doped BiSbX SOT layers 304 should only be used if a special dopant could be found to decrease the c-axis relative to the axis. Very small dopants like Boron or very large dopants like Barium may serve this purpose.

In FIGS. 3B and 3D, each layer within the SOT device 350 is grown epitaxially. The texturing layer 316, the FM layer 312, and the barrier layer 310 each individually has a (100) orientation, which results in the undoped BiSb layer 304 being grown epitaxially with a strong (012) orientation.

By including a seed layer with the example properties discussed above comprising a material that matches the BiSb (012) textured surface of the BiSb layer, such as a (111) polycrystalline material, an amorphous material, nano-crystalline material, or a (100) cubic or (001) tetragonal polycrystalline material, a (012) growth of the BiSb layer is promoted and surface roughness of the BiSb layer is reduced. Improving or maintaining the BiSb (012) textured surface reduces chemical interactions with the BiSb layer, which inhibits Sb migration of the BiSb layer. Furthermore, including a material that matches the BiSb (012) textured surface of the BiSb layer disposed in contact with the BiSb layer improves epitaxy, reduces roughness, and enhances uniformity of the BiSb layer.

Figure 7A:
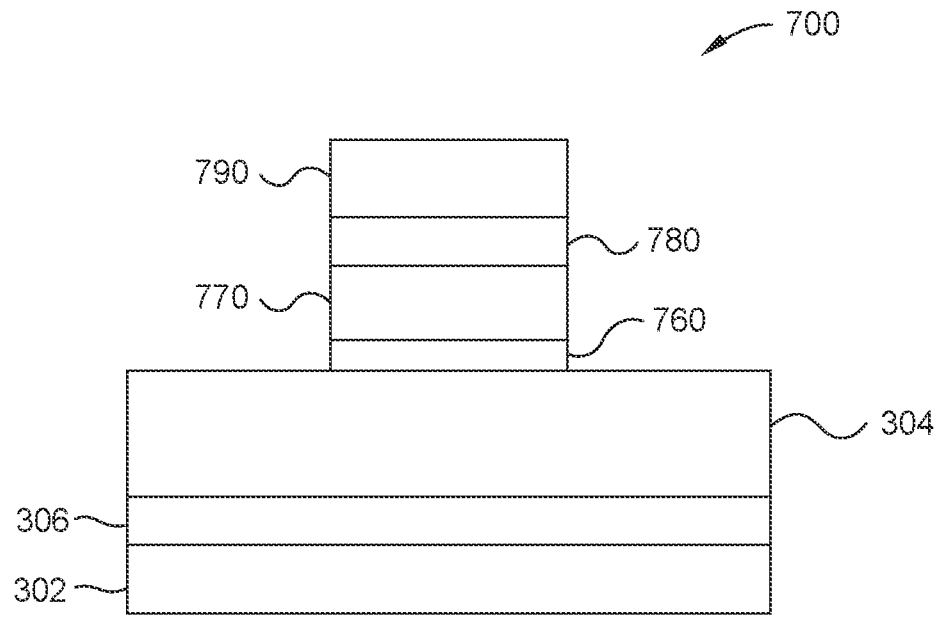
FIG. 7A is a schematic cross-sectional view of a SOT device for use in a MAMR write head, such as the write head of the drive of FIG. 1 or other suitable magnetic media drives.

FIG. 7A is a schematic cross-sectional view of a SOT device 700 for use in a MAMR write head, such as the MAMR write head of the drive 100 of FIG. 1 or other suitable magnetic media drives. The SOT device 700 comprises a BiSb layer 304 with a (012) orientation formed over a seed layer 306 formed over a substrate 302, such as the BiSb layer 304 and the seed layer 306 of FIGS. 3A-3B. A spin torque layer (STL) 770 is formed over the BiSb layer 304. The STL 770 comprises a ferromagnetic material such as one or more layers of CoFe, Colr, NiFe, and CoFeX alloy wherein X=B, Ta, Re, or Ir.

In certain embodiments, an electrical current shunt block layer 760 is disposed between the BiSb layer 304 and the STL 770. The electrical current shunt blocking layer 760 reduces electrical current from flowing from the BiSb layer 304 to the STL 770 but allows spin orbital coupling of the BiSb layer 304 and the STL 770. In certain embodiments, the electrical current shunt blocking layer 760 comprises a magnetic material which provides greater spin orbital coupling between the BiSb layer 304 and the STL 770 than a non-magnetic material. In certain embodiments, the electrical current shunt blocking layer 760 comprises a magnetic material of FeCo, FeCOM, FeCOMO, FeCoMMeO, FeCOM/MeO stack, FeCoMNiMnMgZnFeO, FeCOM/ NiMnMgZnFeO stack, multiple layers/stacks thereof, or combinations thereof in which M is one or more of B, Si, P, Al, Hf, Zr, Nb, Ti, Ta, Mo, Mg, Y, Cu, Cr, and Ni, and Me is Si, Al, Hf, Zr, Nb, Ti, Ta, Mg, Y, or Cr. In certain embodiments, the electrical current shunt blocking layer 760 is formed to a thickness from about 10 Å to about 100 Å. In certain aspects, an electrical current shunt blocking layer 760 having a thickness of over 100 Å may reduce spin orbital coupling of the BiSb layer 304 and the STL 770. In certain aspects, an electrical current shunt blocking layer having a thickness of less than 10 Å may not sufficiently reduce electrical current from BiSb layer 304 to the STL 770.

In certain embodiments, additional layers are formed over the STL 770 such as a spacer layer 780 and a pinning layer 790. The pinning layer 790 can partially pin the STL 770. The pinning layer 790 comprises a single or multiple layers of PtMn, NiMn, IrMn, IrMnCr, CrMnPt, FeMn, other anti-ferromagnetic materials, or combinations thereof. The spacer layer 780 comprises single or multiple layers of magnesium oxide, aluminum oxide, other non-magnetic materials, or combinations thereof.

Figures 7B, 7C:
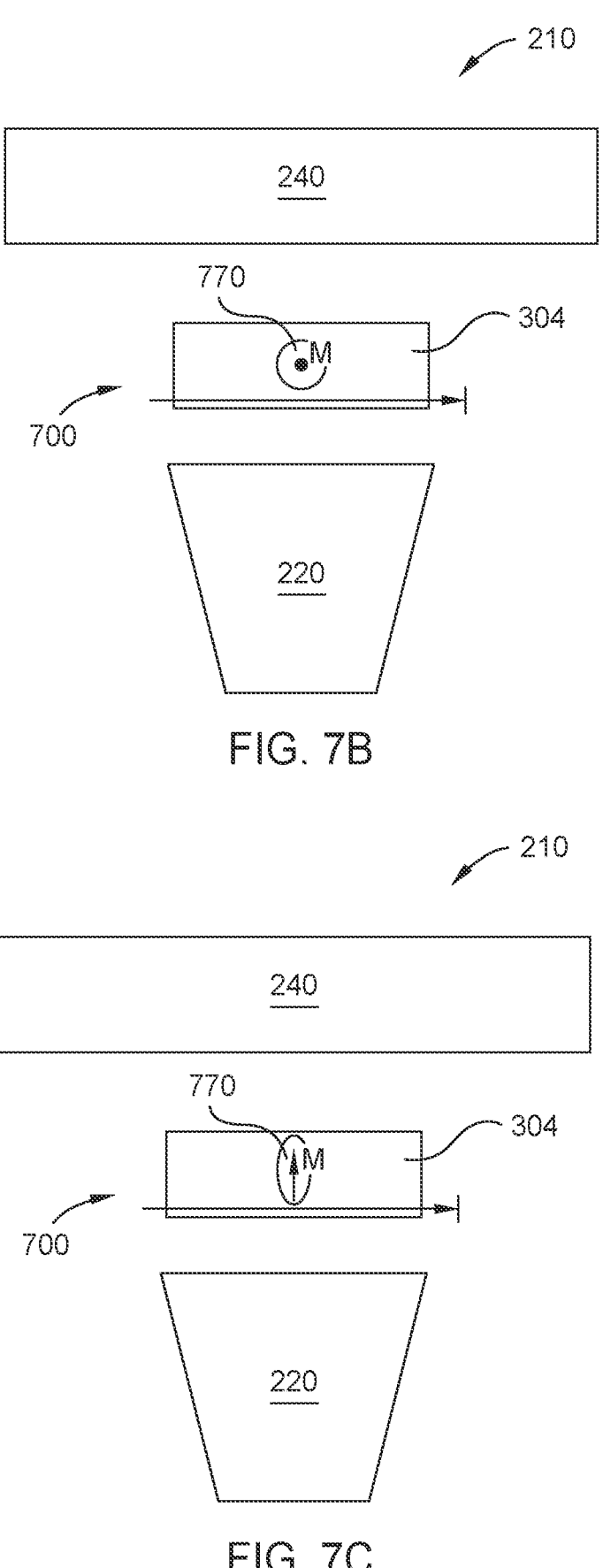
FIGS. 7B-7C are schematic MFS views of certain embodiments of a portion of a MAMR write head with a SOT device of FIG. 7A.

FIGS. 7B-7C are schematic MFS views of certain embodiments of a portion of a MAMR write head 210 with a SOT device 700 of FIG. 7A. The MAMR write head 210 can be the write head FIG. 2 or other suitable write heads in the drive 100 of FIG. 1 or other suitable magnetic media drives such as tape drives. The MAMR write head 210 includes a main pole 220 and a trailing shield 240 in a track direction. The SOT device 700 is disposed in a gap between the main pole and the trailing shield 240.

During operation, charge current through a BiSb layer or layer stack 304 acting as a spin Hall layer generates a spin current in the BiSb layer. The spin orbital coupling of the BiSb layer and a spin torque layer (STL) 770 causes switching or precession of magnetization of the STL 770 by the spin orbital coupling of the spin current from the BiSb layer 304. Switching or precession of the magnetization of the STL 770 can generate an assisting AC field to the write field. Energy assisted write heads based on SOT have multiple times greater power efficiency in comparison to MAMR write heads based on spin transfer torque. As shown in FIG. 7B, an easy axis of a magnetization direction of the STL 770 is perpendicular to the MFS from shape anisotropy of the STL 770, from the pinning layer 790 of FIG. 7A, and/or from hard bias elements proximate the STL 770. As shown in FIG. 7C, an easy axis of a magnetization direction of the STL 770 is parallel to the MFS from shape anisotropy of the STL 770, from the pinning layer 790 of FIG. 7A, and/or from hard bias elements proximate the STL 770.

Figure 8:
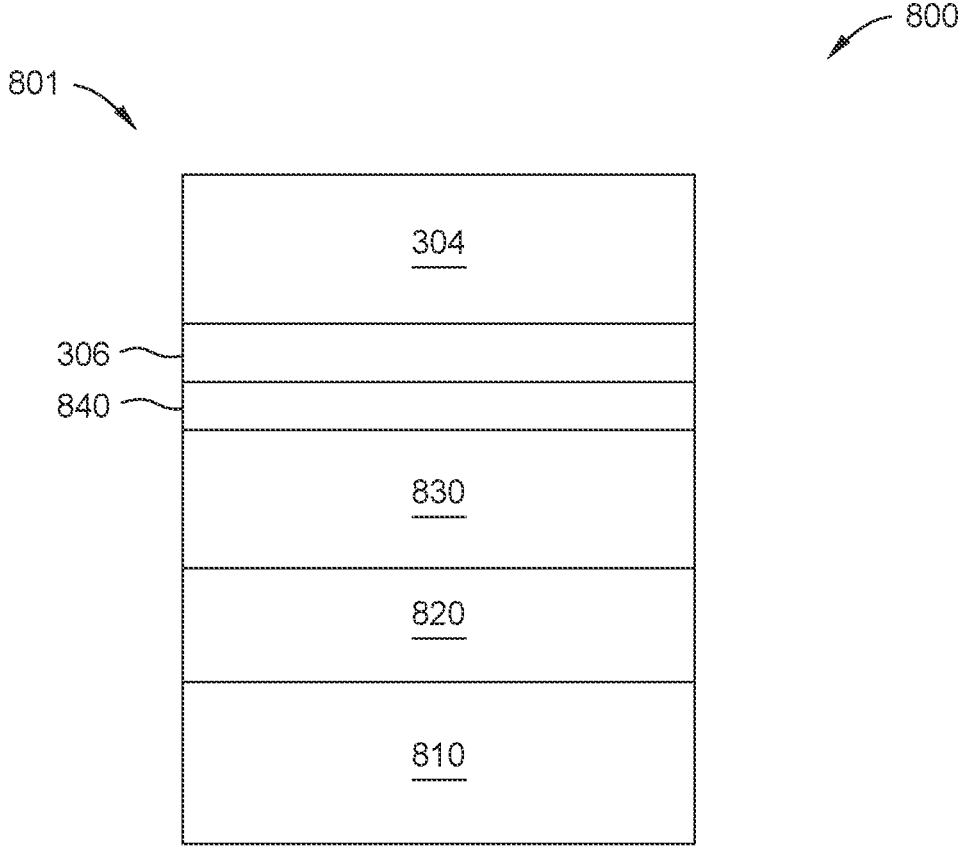
FIG. 8 is a schematic cross-sectional view of a SOT MTJ used as a MRAM device.

FIG. 8 is a schematic cross-sectional view of a SOT MTJ 801 used as a MRAM device 800. The MRAM device 800 comprises a reference layer (RL) 810, a spacer layer 820 over the RL 810, a recording layer 830 over the spacer layer 820, a seed layer 306 over an electrical current shunt block layer 840 over the recording layer 830, and a BiSb layer or layer stack 304 over the seed layer 306. The BiSb layer 304 and the seed layer 306 may be the BiSb layer 304 and the seed layer 306 of FIGS. 3A-3B.

The RL 810 comprises single or multiple layers of CoFe, other ferromagnetic materials, and combinations thereof. The spacer layer 820 comprises single or multiple layers of magnesium oxide, aluminum oxide, other dielectric materials, or combinations thereof. The recording layer 830 comprises single or multiple layers of CoFe, NiFe, other ferromagnetic materials, or combinations thereof.

As noted above, in certain embodiments, the electrical current shunt block layer 840 is disposed between the seed layer 306 and the recording layer 830. The electrical current shunt blocking layer 840 reduces electrical current from flowing from the BiSb layer 304 to the recording layer 830 but allows spin orbital coupling of the BiSb layer 304 and the recording layer 830. For example, writing to the MRAM device can be enabled by the spin orbital coupling of the BiSb layer and the recording layer 830, which enables switching of magnetization of the recording layer 830 by the spin orbital coupling of the spin current from the BiSb layer 304. In certain embodiments, the electrical current shunt blocking layer 840 comprises a magnetic material which provides greater spin orbital coupling between the BiSb layer 304 and the recording layer 830 than a non-magnetic material. In certain embodiments, the electrical current shunt blocking layer 840 comprises a magnetic material of FeCOM, FeCOMO, FeCoMMeO, FeCOM/MeO stack, FeCoMNiMnMgZnFeO, FeCOM/NiMnMgZnFeO stack, multiple layers/stacks thereof, or combinations thereof, in which M is one or more of B, Si, P, Al, Hf, Zr, Nb, Ti, Ta, Mo, Mg, Y, Cu, Cr, and Ni, and Me is Si, Al, Hf, Zr, Nb, Ti, Ta, Mg, Y, or Cr.

The MRAM device 800 of FIG. 8 may include other layers, such as pinning layers, pinning structures (e.g., a synthetic antiferromagnetic (SAF) pinned structure), electrodes, gates, and other structures. Other MRAM devices besides the structure of FIG. 8 can be formed utilizing a BiSb layer 304 with a (012) orientation over a seed layer 306 to form a SOT MTJ 801.

By including a seed layer with the example properties discussed above comprising a material that matches the BiSb (012) textured surface of the BiSb layer, such as a (111) polycrystalline material, an amorphous material, nano-crystalline material, or a (100) cubic or (001) tetragonal polycrystalline material, a (012) growth of the BiSb layer is promoted and surface roughness of the BiSb layer is reduced. Improving or maintaining the BiSb (012) textured surface reduces chemical interactions with the BiSb layer, which inhibits Sb migration of the BiSb layer. Furthermore, including a material that matches the BiSb (012) textured surface of the BiSb layer disposed in contact with the BiSb layer improves epitaxy, reduces roughness, and enhances uniformity of the BiSb layer.

In one embodiment, a SOT device comprises a substrate, a seed layer disposed over the substrate, the seed layer comprising at least one of: a polycrystalline material having a cubic (111) orientation and an a-axis of about 3.53 Å to about 3.81 Å or a hexagonal (002) orientation with an a-axis hexagonal close-packed material with a lattice parameter of a in the range of about 2.50 Å to about 2.69 Å, a polycrystalline material having a cubic (100) orientation or a tetragonal (001) orientation and an a-axis of about 4.1 Å to about 4.7 Å, and a (100) Heusler alloy with a-axis in the range of about 5.8 Å to about 6.6 Å, and a bismuth antimony (BiSb) layer disposed over the seed layer, the BiSb layer having a (012) orientation.

When the seed layer comprises the polycrystalline material having a (111) orientation or (002) hcp orientation, the BiSb layer is doped with one or more of: B, N, Al, Si, Ti, V, Cr, Fe, Ni, Cu, Ge, Y, Zr, Mo, Ru, Y, Zr, Hf, Ta, W, and Ag. When the seed layer comprises polycrystalline material having a cubic (100) orientation or a tetragonal (001) orientation, the seed layer further comprising a texturing layer. The SOT device further comprises a ferromagnetic layer disposed on the texturing layer, a barrier layer disposed on the ferromagnetic layer, an interlayer disposed on the BiSb layer, and a cap layer disposed on the interlayer. The SOT device further comprises an interlayer disposed on the BiSb layer, a ferromagnetic layer disposed on the interlayer, a barrier layer disposed on the ferromagnetic layer, and a cap layer disposed on the barrier. The polycrystalline material having a cubic (100) orientation or a tetragonal (001) orientation is selected from the group consisting of: a Heusler alloy; a half-Heusler alloy; one or more materials selected from the group consisting of: $TiO_2$, $RuO_2$, RuO, FeN, ZnO, TiO, and MgO; one or more materials selected from the group consisting of: V, Nb, Mo, W, Ta, Cr, RuAl, NiAl, RhAl, and alloy combinations thereof, with one or more elements selected from the group consisting of: Ti, Al, Pt, Ni, Co, Fe, and Cr; one or more mono-oxides comprising O and elements or alloys selected from the group consisting of: Sc, Ti, V, Mn, Fe, Ni, Mg, and Zr; one or more mono-carbides comprising C and elements or alloys selected from the group consisting of: Sc, Ti, V, Nb, Zr, Hf, Ta, and W; one or more mono-nitrides comprising N and elements or alloys selected from the group consisting of: Sc, Ti, V, Cr, Nb, Zr, Hf, Ta, and composite alloys thereof; and dioxides of Ti, V, Cr, Ge, Ru, Rh, Sn, Sb, or Ir. A magnetic recording head comprises the SOT device. A magnetic recording device comprises the magnetic recording head. A magneto-resistive memory comprising the SOT device.

In another embodiment, a SOT device comprises a substrate, a seed layer disposed over the substrate, the seed layer comprising at least one of: (A) a nanocrystalline material and a polycrystalline (100) texturing material having a bcc or B2 (100) orientation with a-axis in the range of about 2.86 Å to about 3.31 Å disposed over the nanocrystalline material, or (B) a structure comprising one or more of: a polycrystalline cubic (100) textured material, a polycrystalline tetragonal (001) textured material, wherein the polycrystalline cubic (100) textured material and the polycrystalline tetragonal (001) textured material each individually have an a-axis of about 4.1 Å to about 4.7 Å, and a (100) Heusler with a a-axis in the range of about 5.8 Å to about 6.6 Å disposed on the polycrystalline cubic (100) textured material or the polycrystalline tetragonal (001) textured material, a ferromagnetic layer, at least one barrier layer, a bismuth antimony (BiSb) layer having a (012) orientation, and a cap layer.

The ferromagnetic layer and the at least one barrier layer have a same crystalline orientation as the polycrystalline material having a (100) orientation or a (001) orientation. The BiSb layer has an Sb concentration of about 10 to about 50 atomic percent. The BiSb layer has an a/c ratio of about 0.381 or greater. At least one of the polycrystalline cubic (100) textured material and the polycrystalline tetragonal (001) textured material comprises a material selected from the group consisting of: a Heusler alloy; a half-Heusler alloy; one or more materials selected from the group consisting of: $TiO_2$, $RuO_2$, RuO, FeN, ZnO, TiO, and MgO; one or more materials selected from the group consisting of: V, Nb, Mo, W, Ta, Cr, RuAl, NiAl, RhAl, and alloy combinations thereof, with one or more elements selected from the group consisting of: Ti, Al, Pt, Ni, Co, Fe, and Cr; one or more mono-oxides comprising O and elements or alloys selected from the group consisting of: Sc, Ti, V, Mn, Fe, Ni, Mg, and Zr; one or more mono-carbides comprising C and elements or alloys selected from the group consisting of: Sc, Ti, V, Nb, Zr, Hf, Ta, and W; one or more mono-nitrides comprising N and elements or alloys selected from the group consisting of: Sc, Ti, V, Cr, Nb, Zr, Hf, Ta, and composite alloys thereof; and dioxides of Ti, V, Cr, Ge, Ru, Rh, Sn, Sb, or Ir. A magnetic recording head comprises the SOT device. A magnetic recording device comprises the magnetic recording head. A magneto-resistive memory comprising the SOT device.

In yet another embodiment, a SOT device comprises a substrate, a seed layer disposed on the substrate, the seed layer comprising a polycrystalline material having a (111) orientation and an a-axis of about 3.53 Å to about 3.81 Å, a bismuth antimony (BiSb) layer having a (012) orientation, an interlayer, a ferromagnetic layer, at least one barrier layer, and a cap layer.

The amorphous/nanocrystalline seed layer comprises a material selected from the group consisting of: Si, Ge, $Si_xGe_{1-x}$, $CoSi_2$, $NiSi_2$, NiFe, $NiFeCu_x$, $NiFeCr_x$, $CoFeSi_x$, $NiFeSi_x$, $CoFeGe_x$, $NiFeGe_x$, and alloys thereof, where x is a numeral. The BiSb layer is doped with one or more of: B, N, Al, Si, Ti, V, Cr, Fe, Ni, Cu, Ge, Y, Zr, Mo, Ru, Y, Zr, Hf, Ta, W, and Ag. The interlayer comprises a non-magnetic material. The interlayer is crystalline. A magnetic recording head comprises the SOT device. A magnetic recording device comprises the magnetic recording head. A magneto-resistive memory comprising the SOT device.

In another embodiment, a SOT device comprises a substrate, a seed layer disposed on the substrate, the seed layer comprising an amorphous or nanocrystalline material having a nearest neighbor x-ray diffraction peak d-spacing between about 2.02 Å to about 2.20 Å, a bismuth antimony (BiSb) layer having a (012) orientation, an interlayer, a ferromagnetic layer, at least one barrier layer, and a cap layer.

When the seed layer comprises the amorphous or nanocrystalline material having a (111) orientation, the BiSb layer is doped with one or more of: B, N, Al, Si, Ti, V, Cr, Fe, Ni, Cu, Ge, Y, Zr, Mo, Ru, Y, Zr, Hf, Ta, W, and Ag. The BiSb layer has an a/c ratio of about 0.381 or greater. Doping the BiSb layer with B or Ba increases the a/c ratio. The seed layer further comprises a polycrystalline (100) texturing material having a bcc or B2 (100) orientation with a-axis in the range of about 2.86 Å to about 3.31 Å disposed over the amorphous or nanocrystalline material. A magnetic recording head comprises the SOT device. A magnetic recording device comprises the magnetic recording head. A magneto-resistive memory comprising the SOT device.

While the foregoing is directed to embodiments of the present disclosure, other and further embodiments of the disclosure may be devised without departing from the basic scope thereof, and the scope thereof is determined by the claims that follow.

What is claimed is:

1. A spin-orbit torque (SOT) device, comprising:
a substrate;
a seed layer disposed over the substrate, the seed layer comprising a (100) Heusler alloy with a-axis in a range of about 5.8 Å to about 6.6 Å;
a ferromagnetic layer disposed on the seed layer;
a barrier layer disposed on the ferromagnetic layer, the barrier layer comprising an oxide, nitride, or carbide material;
a bismuth antimony (BiSb) layer disposed on the barrier layer, the BiSb layer having a (012) orientation;
an interlayer disposed on the BiSb layer; and
a cap layer disposed on the interlayer, the cap layer comprising NiFeGe, NiFeTaN, or oxidized NiFeTaN, or comprising a multi-layer structure of NiFeGe/Ru, where "/" denotes separate layers of the multi-layer structure.

2. The SOT device of claim 1, wherein the BiSb layer is doped with one or more of: B, N, Al, Si, Ti, V, Cr, Fe, Ni, Cu, Ge, Mo, Ru, Y, Zr, Hf, Ta, W, and Ag.

3. The SOT device of claim 1, wherein the seed layer further comprises a texturing layer.

4. The SOT device of claim 3,
wherein the ferromagnetic layer is disposed on the texturing layer.

5. A magnetic recording head comprising the SOT device of claim 1.

6. A magnetic recording device comprising the magnetic recording head of claim 5.

7. A magneto-resistive memory comprising the SOT device of claim 1.

8. The SOT device of claim 1, wherein the barrier layers comprises MgO or MgTiO.

9. A spin-orbit torque (SOT) device, comprising:
a substrate;
a seed layer disposed over the substrate, the seed layer comprising a (100) Heusler alloy with a-axis in a range of about 5.8 Å to about 6.6 Å;
a first barrier layer disposed in contact with the seed layer, the first barrier layer comprising an oxide, nitride, or carbide material;
a ferromagnetic layer disposed in contact with the first barrier layer;
a second barrier layer disposed in contact with the ferromagnetic layer, the second barrier layer comprising an oxide, nitride, or carbide material;
a bismuth antimony (BiSb) layer disposed in contact with the second barrier layer, the BiSb layer having a (012) orientation; and
a cap layer disposed over the BiSb layer.

10. The SOT device of claim 9, wherein the BiSb layer has an Sb concentration of about 10 to about 50 atomic percent.

11. The SOT device of claim 9, wherein the BiSb layer is doped with one or more of: B, N, Al, Si, Ti, V, Cr, Fe, Ni, Cu, Ge, Mo, Ru, Y, Zr, Hf, Ta, W, and Ag.

12. The SOT device of claim 9, wherein the BiSb layer has an a/c ratio of about 0.381 or greater.

13. A magnetic recording head comprising the SOT device of claim 9.

14. A magnetic recording device comprising the magnetic recording head of claim 13.

15. A magneto-resistive memory comprising the SOT device of claim 9.

16. The SOT device of claim 9, wherein the first and second barrier layers each individually comprise MgO or MgTiO.

17. The SOT device of claim 9, wherein the cap layer comprises NiFeGe, NiFeTaN, or oxidized NiFeTaN, or comprising a multi-layer structure of NiFeGe/Ru, where "/" denotes separate layers of the multi-layer structure.

18. A spin-orbit torque (SOT) device, comprising:
a substrate;
a seed layer disposed over the substrate, the seed layer comprising a (100) Heusler alloy with a-axis in a range of about 5.8 Å to about 6.6 Å;
a first barrier layer disposed over the seed layer, the first barrier layer comprising an oxide, nitride, or carbide material;
a bismuth (BiSb) layer disposed on the first barrier layer, the BiSb layer having a (012) orientation;
a second barrier layer disposed on the BiSb layer, the second barrier layer comprising an oxide, nitride, or carbide material;
a ferromagnetic layer disposed on the second barrier layer; and
a cap layer disposed over the ferromagnetic layer, the cap layer comprising ene or more materials selected from the group consisting of: NiFeGe, NiFeTaN, and/or oxidized NiFeTaN, or comprising a multi-layer structure selected from the group consisting of NiFeGe/Ru NiFeGe/Ru, where "/" denotes separate layers of the multi-layer structure.

19. The SOT device of claim 18, wherein the BiSb layer is doped with one or more of: B, N, Al, Si, Ti, V, Cr, Fe, Ni, Cu, Ge, Mo, Ru, Y, Zr, Hf, Ta, W, and Ag.

20. The SOT device of claim 18, wherein the seed layer further comprises a texturing layer.

21. The SOT device of claim 18, wherein the BiSb layer has an Sb concentration of about 10 to about 50 atomic percent.

22. The SOT device of claim 18, wherein the BiSb layer has an a/c ratio of about 0.381 or greater.

23. A magnetic recording head comprising the SOT device of claim 18.

24. A magnetic recording device comprising the magnetic recording head of claim 23.

25. A magneto-resistive memory comprising the SOT device of claim 23.

26. The SOT device of claim 18, wherein the first and second barrier layers each individually comprise MgO or MgTiO.

* * * * *